United States Patent
Yu et al.

(10) Patent No.: US 11,537,773 B2
(45) Date of Patent: Dec. 27, 2022

(54) SYSTEMS AND METHODS FOR INTEGRATED CIRCUIT LAYOUT

(71) Applicant: Taiwan Semiconductor Manufacturing Company, Ltd., Hsinchu (TW)

(72) Inventors: Kenan Yu, San Jose, CA (US); Qingwen Deng, San Jose, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/195,953

(22) Filed: Mar. 9, 2021

(65) Prior Publication Data
US 2021/0357561 A1 Nov. 18, 2021

Related U.S. Application Data

(60) Provisional application No. 63/026,506, filed on May 18, 2020.

(51) Int. Cl.
| | |
|---|---|
| G06F 30/3312 | (2020.01) |
| G06F 30/327 | (2020.01) |
| G06F 30/394 | (2020.01) |
| G06F 30/392 | (2020.01) |
| G06F 111/20 | (2020.01) |

(52) U.S. Cl.
CPC ........ *G06F 30/3312* (2020.01); *G06F 30/327* (2020.01); *G06F 30/392* (2020.01); *G06F 30/394* (2020.01); *G06F 2111/20* (2020.01)

(58) Field of Classification Search
USPC .......................................................... 716/100
See application file for complete search history.

(56) References Cited

U.S. PATENT DOCUMENTS

| | | | | |
|---|---|---|---|---|
| 2001/0010090 | A1* | 7/2001 | Boyle | G06F 30/39 716/105 |
| 2002/0162086 | A1* | 10/2002 | Morgan | G06F 30/30 716/102 |
| 2011/0010680 | A1 | 1/2011 | Vuillod et al. | |
| 2017/0371983 | A1 | 12/2017 | Franch et al. | |
| 2022/0036975 | A1* | 2/2022 | Russo | G06F 30/27 |

FOREIGN PATENT DOCUMENTS

| | | |
|---|---|---|
| TW | 201629815 A | 8/2016 |
| TW | I585602 B | 6/2017 |

* cited by examiner

*Primary Examiner* — Mohammed Alam
(74) *Attorney, Agent, or Firm* — Foley & Lardner LLP

(57) ABSTRACT

A method for providing an integrated circuit design is disclosed. The method includes receiving and synthesizing a behavioral description of an integrated circuit design. The method includes generating, based on the synthesized behavioral description, a layout by placing and routing a plurality of transistor-based cells. The method includes selectively accessing a cell library that includes a plurality of non-transistor-based cells, each of the plurality of non-transistor-based cells associated with a respective delay value. The method includes updating the layout by inserting one or more of the plurality of non-transistor-based cells.

20 Claims, 15 Drawing Sheets

SYSTEMS AND METHODS FOR INTEGRATED CIRCUIT LAYOUT

CROSS-REFERENCE TO RELATED APPLICATION

The present application claims priority to U.S. Provisional Application No. 63/026,506, filed on May 18, 2020, which is incorporated by reference herein in its entirety.

BACKGROUND

One aspect of designing an integrated circuit involves determining timing performance to characterize the integrated circuit. In general, the integrated circuit designs (e.g., very large scale integrated circuit (VLSI) designs) have been transitioning to ever-decreasing feature sizes over time. With this transition, timing verification becomes more critical to achieve high electrical performance with complex integrated circuit designs. Furthermore, fast and accurate timing verification techniques are critical to meet the time to market product window demands on today's integrated circuit designs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
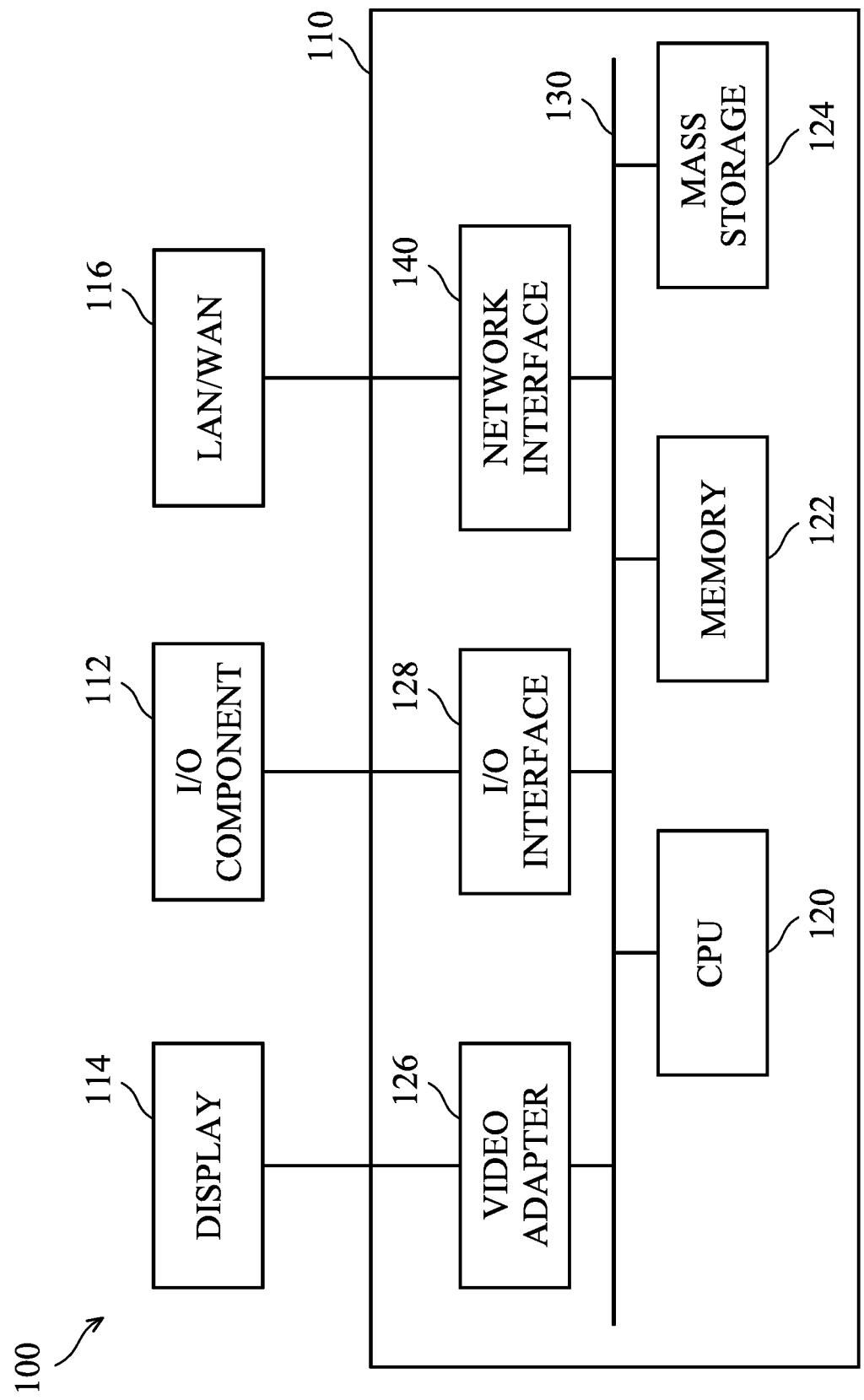
FIG. 1 illustrates a block diagram of a processing system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, electronic design automation (EDA) tools are based on the definition of an integrated circuit using a processing system as a netlist of circuit elements. A cell library is provided that specifies characteristics of cells available for use in a physical implementation using a given technology of the circuit elements in the netlist. The entries in the library include layout data, performance data such as delay models and power models, and other supporting information. To implement (or sometimes referred to as synthesize) the netlist, cells are selected from the cell library, placed in a layout space, and interconnections are defined among the cells. The selection of cells, placement of cells and defining interconnections among the cells is sometimes referred to as placement and routing. The result of a place and route procedure is a layout, which specifies the physical shapes and locations of respective components/elements of each of the cells, and the interconnections of the cells. The layout can be later made into an integrated circuit.

Upon the layout being generated, a timing analysis is typically performed to analyze and verify timing constraints of the integrated circuit. In the timing analysis, the timing constraints define how signals propagate from one section of the integrated circuit to another. For example, the timing constraints can define rising signal (edge) and falling signal (edge) propagation times from a sender/driver circuit to a receiver circuit in the integrated circuit. The timing analysis can break the integrated circuit (design) down into a number of timing paths (e.g., data paths, clock paths, clock-gating paths, asynchronous paths, etc.), calculate the signal propagation delay along each timing path, and check for violations of timing constraints inside the integrated circuit and at the input/output interface. For example, when signals do not propagate through the integrated circuit as defined, timing violations are identified. In general, the timing violations can be grouped into two main categories: hold violations and setup violations. A hold violation can occur when a data signal propagates too quickly, when compared to a clock speed, through a timing path. A setup violation can occur when a data signal propagates too slowly, when compared to a clock speed, through a timing path. The hold and/or setup violations frustrate the logic of an integrated circuit and prevents the integrated circuit from performing the job it was designed to do.

After the timing analysis, it is not uncommon to observe that some of the timing paths have one or more hold violation in the range of a few picoseconds. To resolve this issue, in the existing technologies, one or more delay buffers that are implemented as transistor-based cells are inserted into the violating timing paths to eliminate the hold violations (e.g., by adjusting delay values along the timing paths).

This, however, may trigger other issues such as, for example, one or more setup violations, which are typically defined to be within a window (or margin) in the range of a few picoseconds. This is because a corresponding delay value of the transistor-based cells is typically in the range of 30-50 picoseconds. In this regard, some existing technologies have proposed to add additional interconnecting wires (sometimes referred to as scenic wires) into the violating timing path instead of using transistor-based cells, based on the relatively small delay values contributed by the scenic wires. Although the hold violations can be fixed while not triggering setup violations, this approach can raise other issues. For example, in advanced technology nodes, a width of the interconnecting wire and a spacing between adjacent interconnecting wires both keep shrinking. Inserting such scenic wires significantly increases complexity of designing the integrated circuit (e.g., complicating the design rule check (DRC)). Further, the newly added wires can cause new timing violations and/or noise violations on neighboring timing paths. Still further, the corresponding delay values of the scenic wires are typically difficult to control.

The present disclosure provides various embodiments of systems and methods to fix, complement, or otherwise design an integrated circuit based on non-transistor-based cells. For example, the disclosed system provides one or more cell libraries, each of which includes a number of non-transistor-based cells. Each of the non-transistor-based cells can correspond to a respective delay value that can be defined by one or more polysilicon resistors. For example, by making the polysilicon resistors of the non-transistor-based cells in respective different dimensions and/or configurations, the non-transistor-based cells can be characterized with respective different delay values. Further, the delay value of each non-transistor-based cell can be well defined down to the range of a few picoseconds (e.g., about 2 ~10 picoseconds) by configuring the dimensions of its polysilicon resistor(s), which typical transistor-based cells cannot reach. As such, in an example where a hold violation of 3 picoseconds, along a timing path, exists under a setup margin of 5 picoseconds, the disclosed non-transistor-based cell can be inserted to fix the hold violation, while not triggering further setup violation. Still further, by standardizing such non-transistor-based cells (e.g., making them available as standard cells in the cell libraries during the design of an integrated circuit), when timing violations (e.g., hold violations) occur, the disclosed non-transistor-based cells can be readily available to insert into the violating timing paths to fix the timing violations, while avoiding using any scenic wires.

Referring to FIG. 1, a block diagram of a processing system 100 is provided in accordance with various embodiments of the present disclosure. The processing system 100 can be used to implement any or all of the processes discussed herein. The processing system 100 may include a processing tool 110, such as a desktop computer, a workstation, a laptop computer, or a dedicated unit customized for a particular application. The processing system 100 may be equipped with a display 114 and one or more input/output devices 112, such as a mouse, a keyboard, or printer. The processing unit 110 may include a central processing unit (CPU) 120, memory 122, a mass storage device 124, a video adapter 126, and an I/O interface 128 connected to a bus 130.

The bus 130 may be one or more of any type of several bus architectures including a memory bus or memory controller, a peripheral bus, or video bus. The CPU 120 may include any type of electronic data processor, and the memory 122 may comprise any type of system memory, such as static random access memory (SRAM), dynamic random access memory (DRAM), or read-only memory (ROM).

The mass storage device 124 may include any type of storage device configured to store data, programs, and other information and to make the data, programs, and other information accessible via the bus 130. The mass storage device 124 may include, for example, one or more of a hard disk drive, a magnetic disk drive, an optical disk drive, or the like.

The video adapter 126 and the I/O interface 128 provide interfaces to couple external input and output devices to the processing tool 110. As illustrated in FIG. 1, examples of input and output devices include the display 114 coupled to the video adapter 126 and the I/O device 112, such as a mouse, keyboard, printer, and the like, coupled to the I/O interface 128. Other devices may be coupled to the processing tool 110, and additional or fewer interface cards may be utilized. For example, a serial interface card (not shown) may be used to provide a serial interface for a printer. The processing tool 110 also may include a network interface 140 that may be a wired link to a local area network (LAN) or a wide area network (WAN) 116 and/or a wireless link.

It should be noted that the processing system 100 may include other components. For example, the processing system 100 may include power supplies, cables, a motherboard, removable storage media, cases, and the like. These other components, although not shown, are considered part of the processing system 100.

In various embodiments of the present disclosure, an electronic design automation (EDA) is program code that is executed by CPU 120 to analyze a user file to obtain an integrated circuit layout (described further below with respect to FIG. 2). Further, during the execution of the EDA, the EDA may analyze functional components of the layout, as is known in the art. The program code may be accessed by the CPU 120 via the bus 130 from the memory 122, mass storage device 124, or the like, or remotely through the network interface 140.

Figure 2:
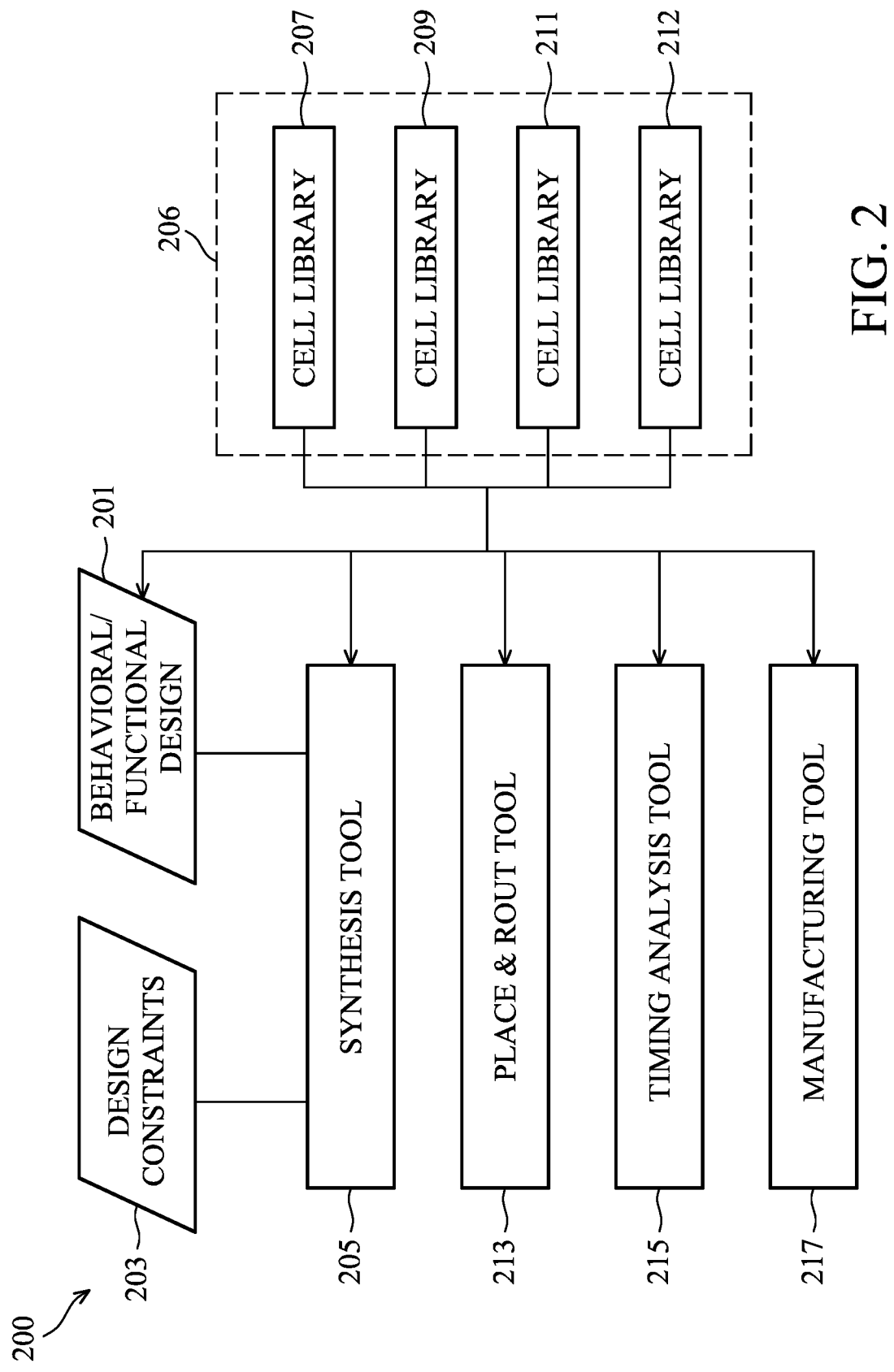
FIG. 2 illustrates a flow diagram used by an electronic design automation, in accordance with some embodiments.

FIG. 2 illustrates one general flow 200 used by the EDA in an embodiment of the present invention to automatically generate and update, if needed, a physical layout based on a user supplied behavioral/functional design 201 and a set of design constraints 203. The behavioral/functional design 201 specifies the desired behavior or function of the circuit based upon various signals or stimuli applied to the inputs of the overall design, and may be written in a suitable language, such as a hardware description language (HDL). The behavioral/functional design 201 may be uploaded into the processing tool 110 (see FIG. 1) through the I/O interface 128, such as by a user creating the file while the EDA is executing. Alternatively, the behavioral/functional design 201 may be uploaded and/or saved on the memory 122 or mass storage device 124, or the behavioral/functional design 201 may be uploaded through the network interface 140 from a remote user (see FIG. 1). In these instances, the CPU 120 will access the behavioral/functional design 201 during execution of the EDA.

In various embodiments, the design constraints 203 may be provided (e.g., by the user) in order to constrain the overall design of the physical layout of the behavioral/functional design 201. The design constraints 203 may be input, for example, through the I/O interface 128, downloading through the network interface 140, or the like. The design constraints 203 may specify various timing constraints and other suitable constraints with which the behavioral/functional design 201, once physically formed into an integrated circuit, must comply. For example, the timing constraints can include setup constraints and hold constraints.

In general, a setup constraint specifies how much time is necessary for data to be available at the input of a sequential device (e.g., a flip-flop, a register, etc.) before the clock edge that captures the data in that device. This constraint enforces a maximum delay on the data path relative to the clock edge. When the setup constraint is disregarded, it is sometimes referred to as the occurrence of a setup violation. For example, a data signal may propagate too slowly, when compared to a clock speed, through a certain timing path. A hold constraint specifies how much time is necessary for data to be stable at the input of a sequential device (e.g., a flip-flop, a register, etc.) after the clock edge that captures the data in that device. This constraint enforces a minimum delay on the data path relative to the clock edge. When the hold constraint is disregarded, it is sometimes referred to as the occurrence of a hold violation. For example, a data signal may propagate too quickly, when compared to a clock speed, through a certain timing path.

The EDA takes the behavioral/functional design 201 and the design constraints 203 and performs a synthesis, e.g., by a synthesis tool 205, to create a functionally equivalent logic gate-level circuit description, such as a netlist. The synthesis tool 205 can form the functionally equivalent logic gate-level circuit description by matching the behavior and/or functions desired from the behavioral/functional design 201 to standard cells from cell libraries 206, which meet the design constraints 203.

The cell libraries 206 may include one or more individual cell libraries, such as a cell library 207, a cell library 209, a cell library 211, and a cell library 212. Although four cell libraries are shown in the illustrated embodiment of FIG. 2, it should be appreciated that the cell libraries 206 can include any number of individual cell libraries while remaining within the scope of the present disclosure. Each of the individual cell libraries contains a listing of pre-designed components, called cells, each of which may perform a discrete logic function on a small scale. The cell is stored in the individual cell libraries (such as cell library 207, cell library 209, cell library 211, or cell library 212) as information comprising internal circuit elements, the various connections to these circuit elements, a pre-designed physical layout pattern that includes the height of each cell along with the cells' designed power rails, dopant implants, wells, and the like. Additionally, the stored cell may also include a shape of the cell, terminal positions for external connections, delay characteristics, power consumption, and the like.

For example, the cell libraries 207 and 209 can each include a collection of (standard) cells that include characterizing data (e.g., layout data, functional definitions, delay information, power information, noise information, etc.) for defining low level logic functions such as, for example, NAND, AND, NOR, OR, INVERT, flip-flops, latches and buffers, which involve a number of transistors. As such, the cell libraries 207 and 209 may sometimes be referred to as "transistor-based cell library 207" and "transistor-based cell library 209," respectively. Further, each of the cells in the cell library 207 has a common cell height (e.g., cell height A), while each of the cells in the cell library 209 also has a common cell height (e.g., cell height B) but different from the cell height A On the other hand, the cell libraries 211 and 212 can each include a collection of (standard) cells that include characterizing data (e.g., layout data, functional definitions, delay information, power information and noise information) for defining timing parameters such as, for example, delay values, which involve no transistors. As such, the cells included in the cell libraries 211 and 212 may sometimes be referred to as "non-transistor-based cell library 211" and "non-transistor-based cell library 212," respectively. Similarly, each of the cells in the cell library 211 has a common cell height (e.g., cell height A), while each of the cells in the cell library 212 also has a common cell height (e.g., cell height B) but different from the cell height A.

The cell heights in these libraries may be measured by the number of metal wires (or tracks) that may be routed through the cell parallel to each other. For example, the cells in the cell libraries 207 and 211 may all have a cell height of 5 tracks, or 5 metal wires routed through the cell parallel to each other, while the cells in cell libraries 209 and 212 may all have a cell height of 3 tracks, or 3 metal wires routed through the cell parallel to each other. It should be understood that the actual dimensions of an individual track may be dependent upon the technology/process node being utilized (e.g., 5 nm process node, 3 nm process node, etc.).

Once the synthesis tool 205 creates the functionally equivalent logic gate-level circuit description from the behavioral/functional design 201 and the design constraints 203 by using one or more of the cell libraries 206 (e.g., the transistor-based cell libraries 207-209), a place and route tool 213 can create an actual physical design for the overall structure (e.g., a physical layout). The place and route tool 213 can form the physical design by taking the chosen cells from the transistor-based cell libraries 207-209 and placing them into cell rows. These cell rows generally have a row height similar to the height of a majority of the individual cells located within that cell row such that the power rails, implants and wells may be aligned between the individual cells. The placement of each individual cell within the cell rows, and the placement of each cell row in relation to other cell rows, may be guided by cost functions in order to minimize wiring lengths and area requirements of the resulting integrated circuit. This placement may be done either automatically by the place and route tool 213, or else may alternatively be performed partly through a manual process, whereby a user may manually insert one or more cells into a row.

Once the placement and route tool 213 finishes generating the actual physical design for the overall structure, a timing analysis tool 215 can check whether the timing constraints specified in the design constraints 203 are met. The timing analysis tool 215 may perform such a timing analysis by performing one or more simulations using circuit simulators, e.g. Simulation Program with Integrated Circuit Emphasis (SPICE). Although in the illustrated embodiment of FIG. 2, only the timing analysis tool 215 is shown, it should be understood that the EDA can include any of various other tools (which are not shown for purposes of clarity) to analyze the physical layout so as to check whether all the design constraints are met. For example, the EDA can check the correctness for manufacturing, electrical issues, noise issues, lithographic issues, and circuitry. If all the design constraints are met, the physical layout may be sent to a manufacturing tool 217 to generate, e.g., photolithographic masks, that may be used in the physical manufacture of the desired design. The physical layout may be sent to the manufacturing tool 217 through that LAN/WAN 116 (FIG. 1) or other suitable forms of transmission from the EDA to the manufacturing tool 217. On the other hand, if not all of the design constraints (e.g., the timing constraints) are met, the timing analysis tool 215 may communicate with the place and route tool 213 to modify, adjust, or otherwise update the physical layout.

Figure 3:
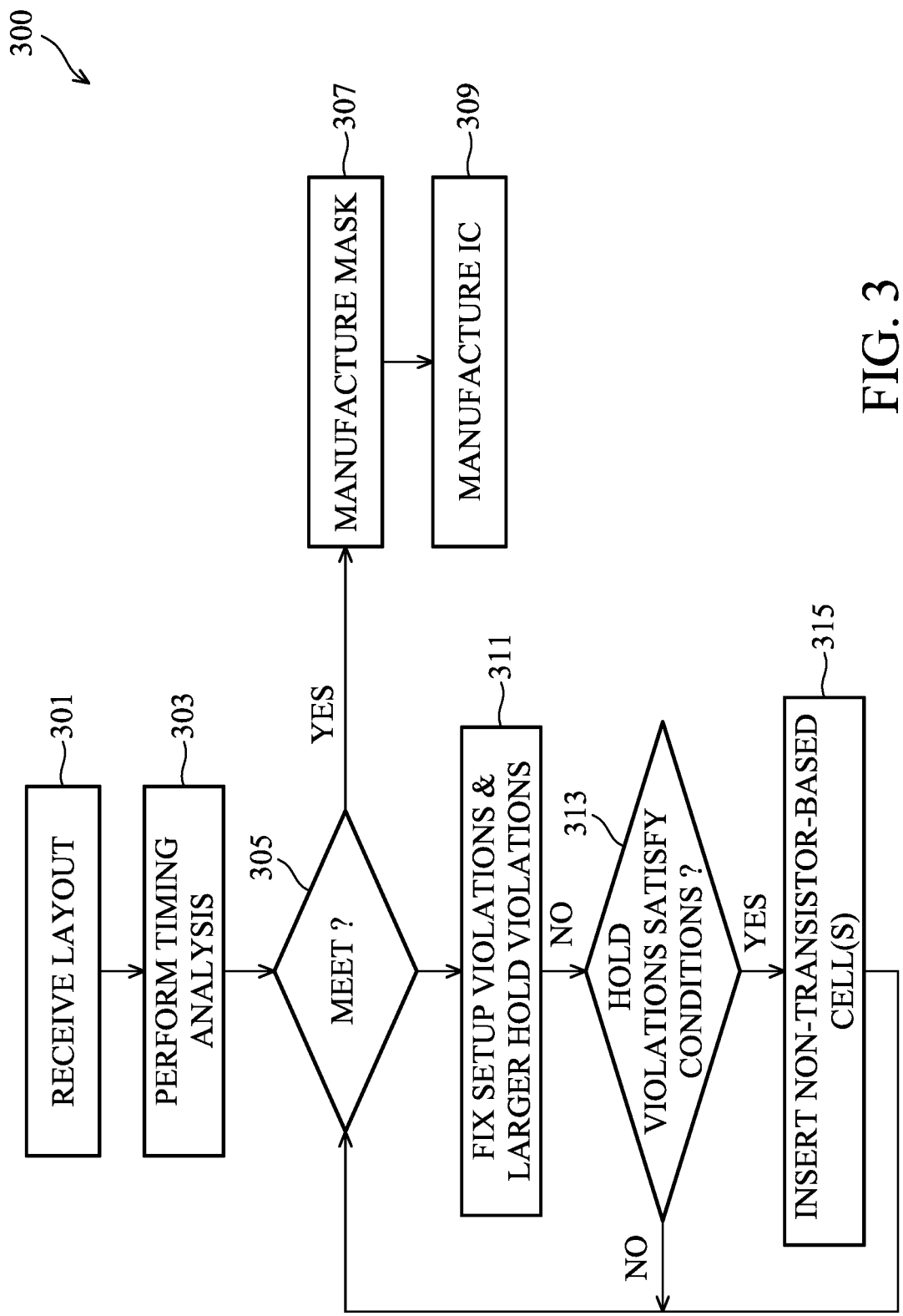
FIG. 3 illustrates a flow chart of a method, performed by the electronic design automation of FIG. 2, to update a physical layout, in accordance with some embodiments.

Referring to FIG. 3, depicted is a flow chart of a method 300 to update a physical layout based on analyzing timing performance of the physical layout, in accordance with various embodiments. The method 300 may be part of an EDA, e.g., the process flow 200 of FIG. 2. In various embodiments, the operations of the method 300 can be performed by one or more components illustrated in FIG. 2. For purposes of discussion, the following embodiment of the method 300 will be described in conjunction with FIG. 2, and a non-limiting example of FIG. 4. The illustrated embodiment of the method 300 is merely an example. Therefore, it is understood that any of a variety of operations may be omitted, re-sequenced, and/or added while remaining within the scope of the present disclosure.

In brief overview, the method 300 starts with provision operation 301 of receiving a layout. Next, the method 300 continues to operation 303 of performing a timing analysis on the layout. The method 300 continues to determination operation 305 to checking whether one or more timing constraints are met. If so, the method 300 proceeds to operation 307 and then to operation 309, in which a mask is manufactured based on the layout and an integrated circuit is manufactured based on the mask, respectively. As mentioned above, prior to operation 307, the EDA may perform various other checks (e.g., electrical checks, noise checks, lithographic checks, etc.), while remaining within the scope of the present disclosure. On the other hand, if not, the method 300 proceeds to operation 311 of fixing setup violation(s) and hold violation(s) that are equal to or greater than a predefined threshold (e.g., 10 picoseconds). Next, the method 300 proceeds to determination operation 313 of checking whether there is any hold violation that is less than the predefined threshold. If not, the method 300 proceeds to the determination operation 305 again. However, if so, the method 300 proceeds to operation 315 of inserting one or more non-transistor-based cells into the layout, and then proceeds to the determination operation 305 again.

The synthesis tool 205 and place and route tool 213 (FIG. 2) can collectively provide the layout received in the operation 301. In some embodiments, such an initial layout is generated based on the behavioral/functional design 201 and design constraints 203 specifying an integrated circuit using the cells from the transistor-based cell libraries 207-209. Upon receiving the layout, the timing analysis tool 215 (FIG. 2) can perform at least one timing analysis based on the design constraints specified in the design constraints 203 (FIG. 2) in the operation 303. The timing analysis tool 215 can validate the timing performance of the layout by checking all possible timing paths for timing violations.

For example, the timing analysis tool 215 can break the integrated circuit design (e.g., after being initially laid out) down into a number of timing paths, calculate the signal propagation delay along each timing path, and check for violations of timing constraints of the layout. Each timing path consists of the following elements: a startpoint, a combinational logic network, and an endpoint. The startpoint may be the start of a timing path where data is launched by a clock edge or where the data is required to be available at a specific time. Every startpoint is either an input port or a register clock pin. The combinational logic network may include one or more elements that have no memory or internal state. For example, the combinational logic can include AND, OR, XOR, and inverter elements, but cannot include flip-flops, latches, registers, or RAM. The endpoint may be the end of a timing path where data is captured by a clock edge or where the data is required to be available at a specific time. Every endpoint is either a register data input pin or an output port.

Figure 4:
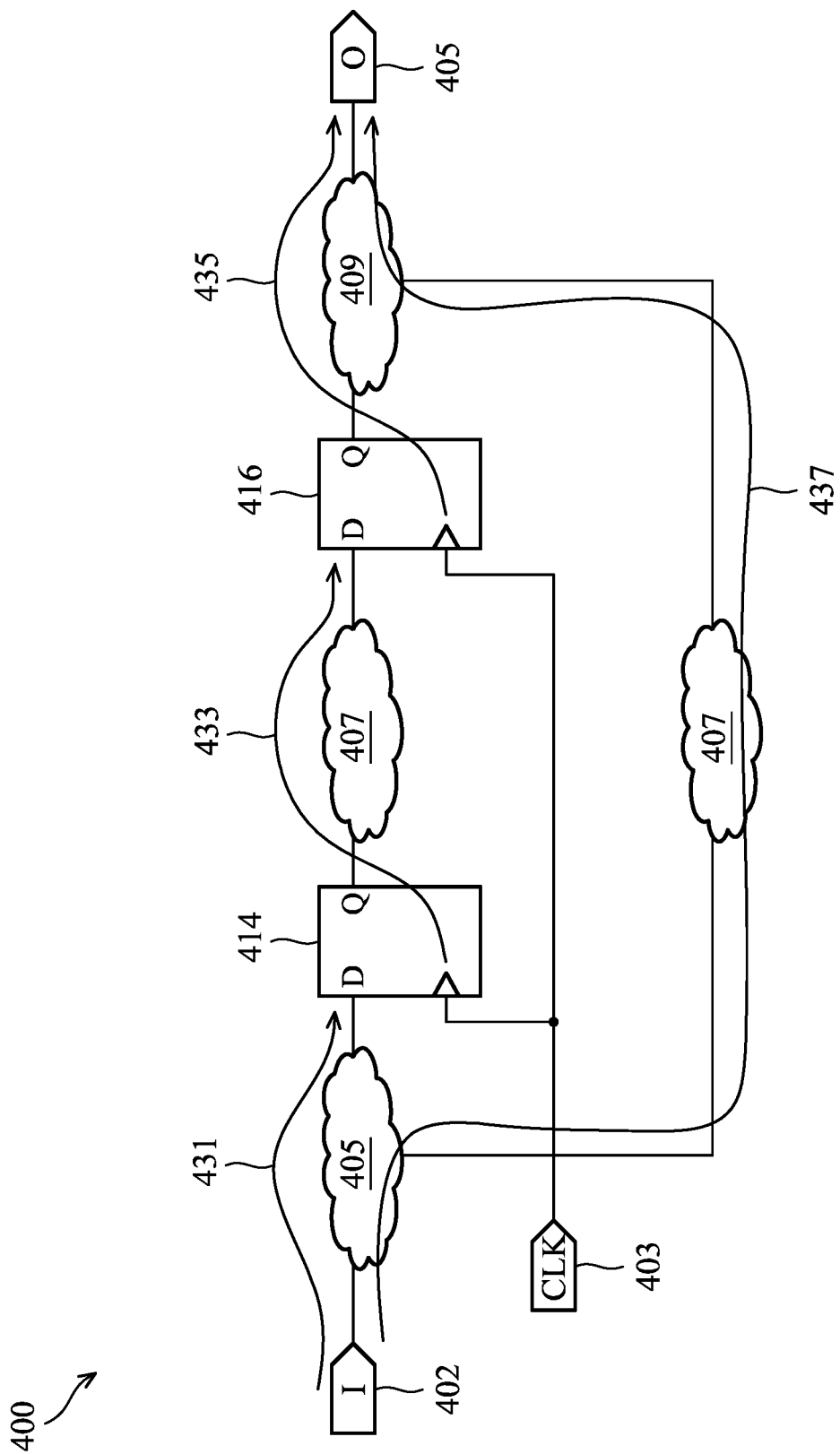
FIG. 4 illustrates an example integrated circuit design, in accordance with some embodiments.

FIG. 4 illustrates an example integrated circuit design 400, in accordance with various embodiments. The integrated circuit design 400 includes an input port 402, a clock input port 403, and an output port 404. Between the input port 402 and output port 404, there are a number of combinational logics (each illustrated as a logic cloud in the example of FIG. 4) 405, 407, 409, and 411, and a number of sequential devices (each illustrated a flip-flop in the example of FIG. 4) 414 and 416. Each of the sequential devices 414-416 may be triggered or otherwise driven by the clock input port 403. It should be understood that the integrated circuit design 400 is merely an illustrated example, and thus, the integrated circuit design 400 can include any number of input ports, output ports, clock signals, combinational logics, and/or sequential devices while remaining within the scope of the present disclosure.

Referring again to the operation 303 of FIG. 3 (and in conjunction with FIGS. 2 and 4), the timing analysis tool 215 can break the integrated circuit design 400 into timing paths: 431, 433, 435, and 437. For example, the timing path 431 has a startpoint at the input port 402, through the combinational logic 405, and an endpoint at a data input port of the flip-flop 414; the timing path 433 has a startpoint at a clock port of the flip-flop 414, through the combinational logic 407, and an endpoint at a data input port of the flip-flop 416; the timing path 435 has a startpoint at a clock port of the flip-flop 416, through the combinational logic 409, and an endpoint at the output port 404; and the timing path 437 has a startpoint at the input port 402, through the combinational logics 405, 411, and 409, and an endpoint at the output port 404.

It should be appreciated that each combination logic may include multiple paths, some of which may have more gates (rendering longer timing paths) and others of which may have fewer gates (rendering shorter timing paths). The timing analysis tool 215 can use the longest timing path to calculate a maximum delay and the shortest path to calculate a minimum delay, in some embodiments. Although not shown, the timing analysis tool 215 can also analyze one or more other types of timing paths such as, for example, a clock path, a clock-gating path, and an asynchronous path, while remaining within the scope of the present disclosure. The clock path may start from a clock input port or cell port, through one or more buffers or inverters, to the clock port of a sequential device. The clock-gating path may start from an input port to a clock-gating device. The asynchronous path may start from an input port to an asynchronous set or clear port of a sequential device.

Upon breaking down the design into a set of timing paths, the timing analysis tool 215 can calculate the delay along each timing path. The total delay of a path is the sum of all cell delays and net delays along the timing path. A cell delay is the amount of delay from input to output of a logic gate in a timing path. The timing analysis tool 215 can calculate the cell delay from delay tables provided in the cell library (e.g., the transistor-based cell libraries 207 and 209) for the cell. Typically, a delay table lists the amount of delay as a function of one or more variables, such as input transition time and output load capacitance. From these table entries, the timing analysis tool 215 can calculate each cell delay. A net delay is the amount of delay from the output of a cell to the input of the next cell in a timing path. This delay may be caused by the parasitic capacitance of the interconnecting wires between the two cells, combined with net resistance and the limited drive strength of the cell driving the net.

Next, in the operation 305, the timing analysis tool 215 can check whether the design constraints 203 are met by checking for violations of timing constraints in each of the timing paths such as, for example, setup constraints and hold constraints specified in the design constraints 203. As described above, a setup constraint specifies how much time is necessary for data to be available at the input of a sequential device (e.g., a flip-flop, a register, etc.) before the clock edge that captures the data in that device; and a hold constraint specifies how much time is necessary for data to be stable at the input of a sequential device (e.g., a flip-flop, a register, etc.) after the clock edge that captures the data in that device.

For example, the timing analysis tool 215 can perform a setup violation check based on the setup constraint. Using the timing path 433 (FIG. 4), which is a data path, as a representative example, the timing analysis tool 215 verifies that the data launched from the flip-flop 414 reaches the flip-flop 416 within one clock cycle, and arrives at least a first period of time before the data gets captured by the next clock edge at the flip-flop 416. If the data path delay is too long (e.g., causing the first period of time to be greater than a setup window/margin specified by the setup constraint), the timing analysis tool 215 may determine the presence of a setup violation along the timing path (and its corresponding amount, which is by how much the first period of time exceeds the setup window). For such a setup violation check, the timing analysis tool 215 can consider the longest possible delay along the timing path 433 and the shortest possible delay along the clock path (e.g., from the clock port 403 to the clock port of the flip-flop 416) between the flip-flops 414-416.

In another example, the timing analysis tool 215 can perform a hold violation check based on the hold constraint. Continuing with the above example of the timing path 433, the timing analysis tool 215 verifies that the data launched from the flip-flop 414 reaches the flip-flop 416 no sooner than the capture clock edge for the previous clock cycle. This check ensures that the data already existing at the data input port of the flip-flop 416 remains stable long enough (e.g., for a second period of time) after the clock edge that captures data for the previous cycle. If the data path delay is too short (e.g., causing the second period of time to be less than a hold window/margin specified by the hold constraint), the timing analysis tool 215 may determine the presence of a hold violation along the timing path (and its corresponding amount, which is by how much the second period of time falls short of the hold window). For such a hold violation check, the timing analysis tool 215 can consider the shortest possible delay along the data path and the longest possible delay along the clock path (e.g., from the clock port 403 to the clock port of the flip-flop 416) between the flip-flops 414-416.

Upon determining that not all timing constraints are met (e.g., the presence of setup and/or hold violations), in the operation 311, the timing analysis tool 215 can first fix the identified setup violation(s) and relatively large hold violation(s). In some embodiments, the timing analysis tool 215 may determine a hold violation "as relatively large" by identifying that its corresponding amount does not satisfy a predefined condition (e.g., greater than an upper limit of the condition). In some embodiments, the condition may include a range from about 2 picoseconds to about 10 picoseconds, while other ranges may be possible. The timing analysis tool 215 can fix the setup violations by updating the layout. The timing analysis tool 215 may cause the place and route tool 205 to update the layout. For example, the place and route tool 205 can remove one or more cells along a violating data path to reduce its delay, add one or more buffers (e.g., from the transistor-based cell libraries 207-209) to increase clock delay, or combinations thereof. Also, the timing analysis tool 215 can fix the relatively large hold violations by updating the layout using the cells from the transistor-based cell libraries 207-209. The timing analysis tool 215 may cause the place and route tool 205 to update the layout. For example, the place and route tool 205 can insert one or more buffers (e.g., from the transistor-based cell libraries 207-209) along a violating data path to increase its delay, exchange one or more cells along the violating data path with one or more buffers (e.g., from the transistor-based cell libraries 207-209) in a smaller size, or combinations thereof.

Next, in the operation 313 (e.g., after fixing the setup violation(s) and relatively large hold violation(s)), the timing analysis tool 215 can determine whether there is any relatively small hold violation. The timing analysis tool 215 may determine a hold violation "as relatively small" by identifying that its corresponding amount satisfies a predefined condition (e.g., within the condition). In some embodiments, the condition may include a range from about 2 picoseconds to about 10 picoseconds, while other ranges may be possible. The timing analysis tool 215 can also fix such relatively small hold violations by updating the layout.

Different from accessing the transistor-based cell libraries 207-209 when fixing the setup violations and relatively large hold violations, in response to determining the presence of relatively small hold violations, the timing analysis tool 215 may cause the place and route tool 205 to access the non-transistor-based cell libraries 211-212 to update the layout. For example, in the operation 315, the place and route tool 205 can insert one or more cells (e.g., from the non-transistor-based cell libraries 211-212) along a violating data path to increase its delay, exchange one or more cells along the violating data path with one or more cells (e.g., from the non-transistor-based cell libraries 211-212) in a smaller size, or combinations thereof. In some embodiments, the place and route tool 205 can insert the non-transistor-based cell(s) to the data input port of a sequential device that is configured to capture data along the violating data path. In some embodiments, the place and route tool 205 can insert the non-transistor-based cell(s) to an output port along the violating data path.

In an example where the timing path 433 is identified as having a relatively small hold violation, the place and route tool 205 can insert one or more cells, selected from the non-transistor-based cell libraries 211-212, into the timing path 433. The place and route tool 205 may insert one non-transistor-based cell right before the data input port of the flip-flop 416 and after the combination logic 407. The flip-flop 416, as exemplified herein, is sometimes referred to as a capture flip-flop that is configured to capture data along the timing path 433. In another example where the timing path 435 is identified as having a relatively small hold violation, the place and route tool 205 can insert one or more cells, selected from the non-transistor-based cell libraries 211-212, into the timing path 435. The place and route tool 205 may insert one non-transistor-based cell right before the output port 404 and after the combinational logic 409. In yet another example where the timing path 431 is identified as having a relatively small hold violation, the place and route tool 205 can insert one or more cells, selected from the non-transistor-based cell libraries 211-212, into the timing path 431. The place and route tool 205 may insert one non-transistor-based cell right before the data input port of the flip-flop 414 and after the combinational logic 405. The flip-flop 414, as exemplified herein, is sometimes referred to as a capture flip-flip that is configured to capture data along the timing path 431. In yet another example where the timing path 437 is identified as having a relatively small hold violation, the place and route tool 205 can insert one or more cells, selected from the non-transistor-based cell libraries 211-212, into the timing path 437. The place and route tool 205 may insert one non-transistor-based cell right before the output port 404 and after the combinational logic 409. However, it should be understood that the place and route tool 205 may insert one or more such non-transistor-based cells in any other position along each of the violating timing paths, while remaining within the scope of the present disclosure.

Further, the place and route tool 205 can select which of the non-transistor cell libraries 211-212 to access based on the row height of a cell row (on a layout space) along which other cells of a violating timing path are disposed. Specifically, when respective (transistor-based) cells of the sequential device(s) and combinational logic(s) along a violating timing path are disposed along a cell row having a certain row height, the place and route tool 205 can select the non-transistor cell library having cells with a cell height that can fit the row height.

For example, when identifying that the timing path 433 has a relatively small hold violation, the place and route tool 205 can first determine the row height of a cell row along which a cell of the flip-flop 416 is disposed. In an embodiment where the cell of the flip-flop 416 is disposed along a cell row with 1 times the cell height A (e.g., from the cell library 207), the place and route tool 205 can select one non-transistor-based cell from the cell library 211, of which all the cells share the cell height A, and place the selected cell adjacent to the cell of the flip-flop 416. In another embodiment where the cell of the flip-flop 416 is disposed along a cell row with 1 times the cell height B (e.g., from the cell library 209), the place and route tool 205 can select one non-transistor-based cell from the cell library 212, of which all the cells share the cell height B, and place the selected cell adjacent to the cell of the flip-flop 416. In yet another embodiment where the cell of the flip-flop 416 is disposed along a cell row with 2 times the cell height A (e.g., from the cell library 207), the place and route tool 205 can select two non-transistor-based cells from the cell library 211, of which all the cells share the cell height A, abut these two non-transistor-based cells with each other, and place the abutted cells adjacent to the cell of the flip-flop 416. In yet another embodiment where the cell of the flip-flop 416 is disposed along a cell row with 1 times the cell height A (e.g., from the cell library 207) and 1 times the cell height B (e.g., from the cell library 209), the place and route tool 205 can select one non-transistor-based cell from the cell library 211, of which all the cells share the cell height A, and one non-transistor-based cell from the cell library 212, of which all the cells share the cell height B, abut these two non-transistor-based cells with each other, and place the abutted cells adjacent to the cell of the flip-flop 416.

According to various embodiments of the present disclosure, the cells included in the non-transistor-based cell libraries 211-212 each include a passive device and involve no active device (e.g., a transistor). For example, the cell, as disclosed herein, includes at least one resistor, which can be implemented as a polysilicon resistor. The polysilicon resistor can be formed over either active regions (e.g., one or more semiconductor fins) or isolation regions (one or more shallow trench isolation (STIs)) over a substrate, which can induce a capacitor between the polysilicon resistor and the substrate. As such, each of the disclosed cells can include at least one resistor and one capacitor that can collectively result in the cell having a respective RC delay (hereinafter "RC delay cell"). For example, the resistor's corresponding resistance and the capacitor's corresponding capacitance contribute to the value of the RC delay.

By introducing a delay in the RC delay cell through passive device(s), the corresponding delay value can be controlled down to the range of a few picoseconds where conventional transistor-based cells cannot reach. Further, formation of the RC delay cells is compatible with formation of other transistor-based cells, which can further enable standardization of the RC delay cell (e.g., being accessed through a cell library). In other words, the disclosed RC delay cells can be readily available to be inserted into a layout design, when needed (e.g., when having relatively small hold violations). Alternatively or additionally, the RC delay cell may be combined with a transistor-based cell as a new standard cell. For example, the RC delay cell may be coupled to an input port of a buffer (which is implemented as a transistor-based cell), an output port of the buffer, or between two inverters of the buffer. The availability of different types of cells (e.g., the transistor-based cells, the RC delay cells) allows the synthesis tool 205 and the place and route tool 213 to choose the cells that best suit the performance characteristics (e.g., power consumption, speed, etc.) required by the behavioral/functional design 201 within the limits of the design constraints 203, thereby allowing for better efficiency of the overall design.

FIGS. 5, 6, 7, and 8 illustrate various examples of design layouts to fabricate the disclosed RC delay cell, in accordance with various embodiments. Each of the layouts may be used to fabricate an RC delay cell that includes at least one polysilicon resistor and one induced capacitor. Given the different configurations of the layouts in FIGS. 5-8 (e.g., the number of polysilicon resistors, the cell height, etc.), each of the corresponding RC delay cells can have a respective RC delay value. Further, by changing one or more configurations within each of the layouts (e.g., the dimensions of the polysilicon resistor, the conduction characteristic of the polysilicon resistor, etc.), the corresponding RC delay value can be further adjusted. FIGS. 9, 10-11, 12, and 13-14 respectively illustrate corresponding cross-sectional views of the RC delay cells of FIGS. 5-8, upon those cells being at least partially fabricated (by adopting a certain technology). For example, FIG. 9-14 illustrate the partially fabricated RC delay cells based on fin-based field-effect-transistor (FinFET) technologies. It is understood that the RC delay cells of FIGS. 5-8 can be fabricated by adopting various other technologies (e.g., planar complementary metal-oxide-semiconductor (CMOS) technologies, gate-all-around (GAA) transistor technologies, etc.), while remaining within the scope of the present disclosure.

Figure 5:
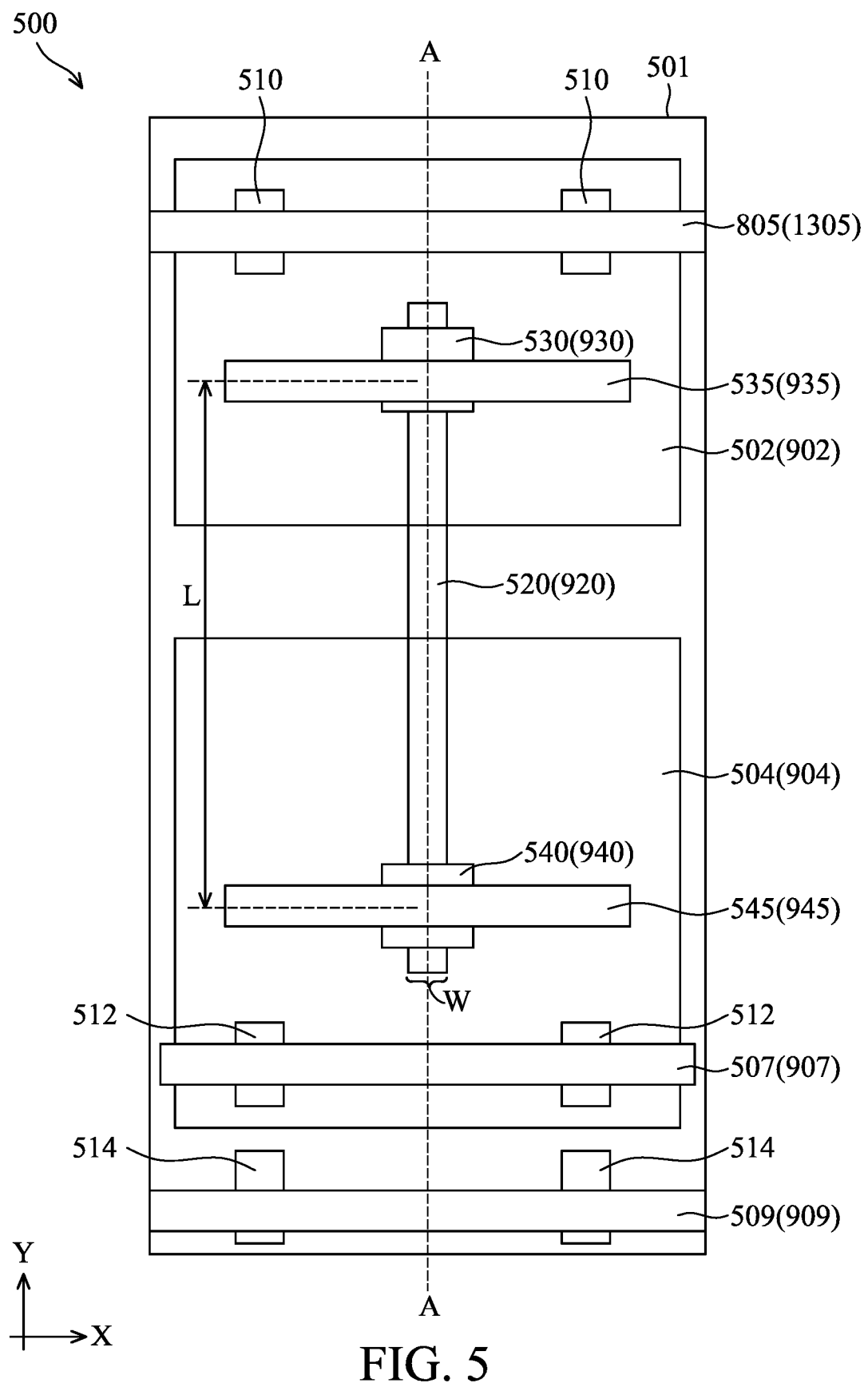
FIGS. 5, 6, 7, and 8 illustrate various examples of design layouts to fabricate an RC delay cell that can be used by the electronic design automation of FIG. 2, in accordance with some embodiments.
Figure 9:
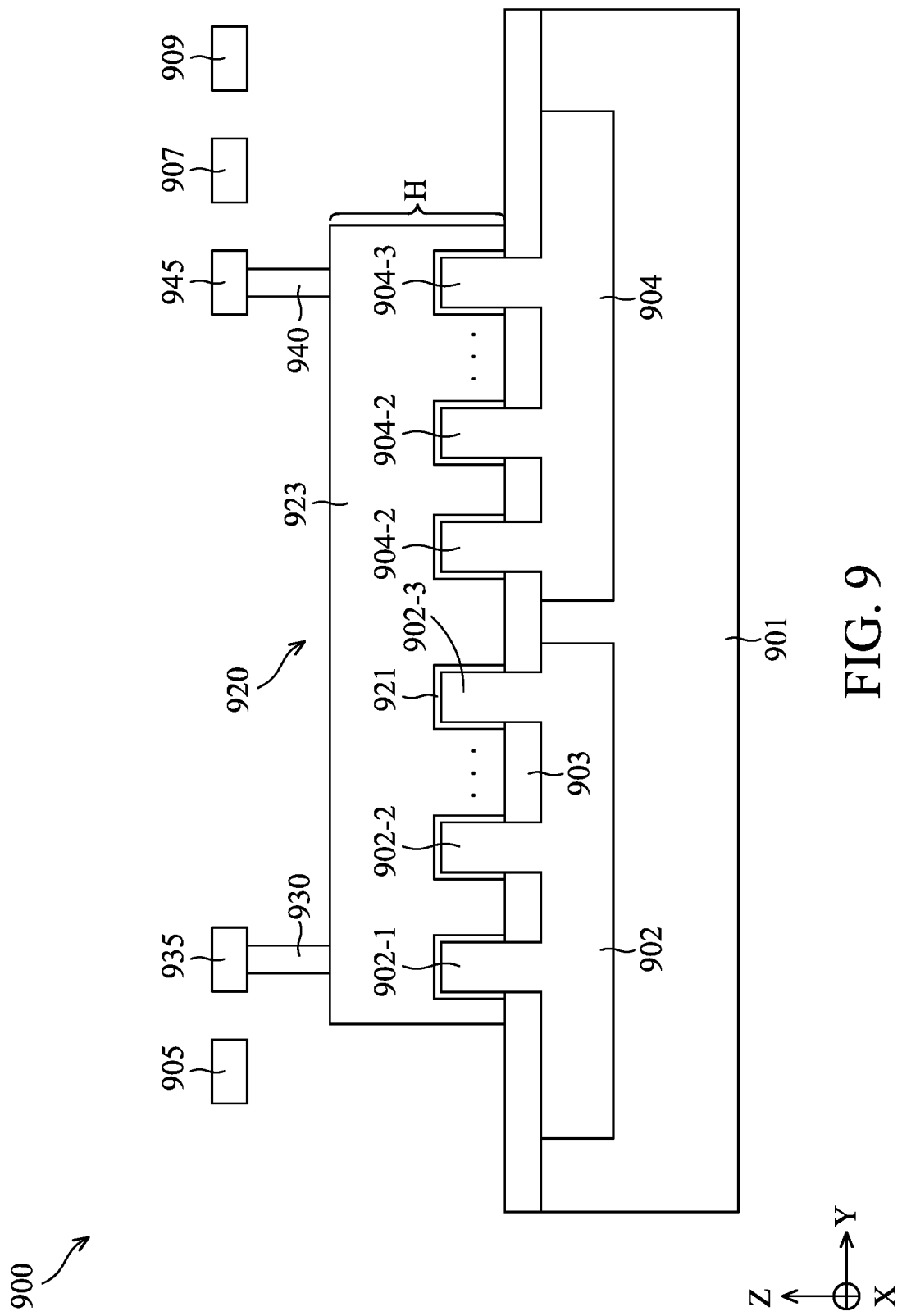
FIGS. 9, 10-11, 12, and 13-14 respectively illustrate corresponding cross-sectional views of the RC delay cells of FIGS. 5-8, upon those cells being at least partially fabricated, in accordance with some embodiments.

Referring to FIG. 5, the layout of an RC delay cell 500 is depicted, in accordance with various embodiments. The layout of the RC delay cell 500 includes various features, each of which corresponds to one or more patterning process (e.g., a photolithography process) to make one or more physical device features. Some of the physical device features are shown in the cross-sectional view of FIG. 9 where an example device 900 is fabricated based on the layout of FIG. 5 (e.g., by adopting a FinFET technology). The cross-sectional view of FIG. 9 is cut along A-A direction as indicated in FIG. 5. Hereinafter, the layout of the RC delay cell 500 of FIG. 5 may sometimes be discussed in conjunction with FIG. 9.

For example, the layout includes a feature 501 that defines a boundary of the RC delay cell 500 (hereinafter cell boundary 501). The cell boundary 501 may have a cell height (along the Y direction), which may be equal to the cell height A or the cell height B, as described above. The cell boundary 501 may correspond to an area over a substrate 901. Over the cell boundary 501, the layout 500 includes active features, 502 and 504, separated from each other along the Y direction. The active feature 502 may be configured to define a first active region with a first conduction type (e.g., n-type), 902 in FIG. 9 (hereinafter active region 902). The active feature 504 may be configured to define a second active region with a second conduction type (e.g., p-type), 904 in FIG. 9 (hereinafter active region 904). Although the active feature 502 and 504 (and corresponding active regions 902 and 904) are formed separated apart from each other, e.g., by an isolation region (not shown), it should be understood that such two features/regions can be formed abutted to each other while remaining within the scope of the present disclosure.

In various embodiments, the active regions 902-904 may define the footprint of one or more channel structures. The channel structures of the RC delay cell 500 may not include source/drain structures, and thus, the channel structures may not be configured to conduct currents. These channel structures of the RC delay cell 500 may be concurrently formed with respective channel structures of the transistor-based cells that are used to form the sequential devices 414-416 and combinational logics 405-411 (shown in FIG. 4), but masked out during certain process steps (e.g., the step of forming source/drain structures for the transistor-based cells). These channel structures may each be formed as a fin structure protruding from the substrate 901, while various other structures (e.g., a set of nanostructures vertically separated from each other) may be possible. For example in FIG. 9, a number of fin structures 902-1, 902-2, and 902-3 are formed over the first active region 902, and a number of fin structures 904-1, 904-2, and 904-3 are formed over the second active region 904. The neighboring fin structures may be separated (e.g., electrically isolated) from each other by one or more isolation regions (e.g., shallow trench isolations (STIs)) 903. Although three fin structures are shown over the active region each, it should be understood that any number of fin structures can be formed in each of the active regions.

Referring again to FIG. 5 (and in conjunction with FIG. 9), over the active feature 502, the layout includes one or more contact features 510 configured to define bulk (or body) contacts. The bulk contacts are configured to electrically connect the first active region 902 to an interconnecting structure 905, which can be formed based on an interconnecting feature 505. Over the active feature 504, the layout includes one or more contact features 512 configured to define bulk (or body) contacts. The bulk contacts are configured to electrically connect the second active region 904 to an interconnecting structure 907, which can be formed based on an interconnecting feature 507. Adjacent to the active feature 504 (opposite to the active feature 502), the layout includes one or more contact features 514 configured to define bulk (or body) contacts. The bulk contacts are configured to electrically connect the substrate 901 to an interconnecting structure 909, which can be formed based on an interconnecting feature 509. In the example where the first active region 902 includes n-type dopants and the second active region 904 includes p-type dopants, the interconnecting structure 905 may include or be coupled to a first power rail configured to provide a first power supply, VDD, and the interconnecting structure 907/909 may include or be coupled to a second power rail configured to provide a second power supply, VSS (or ground).

In various embodiments, the layout of the RC delay cell 500 includes a gate feature 520 that extends along the Y direction and crosses over a portion of each of the active features 502-504. The gate feature 520 may be configured to define a dummy gate structure 920 over the channel structures formed in the active regions 902 and 904, respectively, as shown in FIG. 9. In some embodiments, the dummy gate structure 920 includes a dummy gate dielectric 921 overlaying (a portion of) the fin structures 902-1-3 and 904-1-3 and a dummy gate 923 overlaying the dummy gate dielectric 921. The dummy gate structure 920 of the RC delay cell 500 may be concurrently formed with respective dummy gate structures of the transistor-based cells that are used to form the sequential devices 414-416 and combinational logics 405-411 (shown in FIG. 4), but masked out during certain process steps (e.g., the step of replacing the dummy gate structures for the transistor-based cells).

In various embodiments, the dummy gate 923 include polysilicon, which can form a polysilicon resistor (hereinafter polysilicon resistor 923). The dummy gate 923 may include non-doped or doped polysilicon (e.g., via ion implantation), and the dummy gate dielectric 921 may include a high-k dielectric material layer. The dummy gate 923 alternatively or additionally may include amorphous silicon. The high-k dummy gate dielectric 921 may include a dielectric material having the dielectric constant higher than that of thermal silicon oxide, which is about 3.9. In one example, the high-k dummy gate dielectric 921 includes hafnium oxide (HfO). In various examples, the high-k dummy gate dielectric 921 includes metal oxide, metal nitride, or combinations thereof. Although in the illustrated embodiment of FIGS. 5 and 9, the polysilicon resistor 923 is formed over one or more active regions (e.g., 902, 904), it should be understood that the polysilicon resistor 923 can be formed over non-active regions of the substrate while remaining within the scope of the present disclosure. For example, the polysilicon resistor 923 can be formed in an isolation region (e.g., a shallow trench isolation (STI)) of the substrate 901.

In various embodiments, the layout of the RC delay cell 500 includes contact features, 530 and 540, disposed on the ends of the gate feature 520, which can be used to define contacts, 930 and 940, as shown in FIG. 9. The contacts 930 and 940 may be configured to electrically connect the polysilicon resistor 923 to interconnecting structures, 935 and 945, which can be defined by interconnecting features 535 and 545, respectively. The interconnecting structures 935 and 945 can respectively function as input/output ports that enables the RC delay cell 500 to electrically couple to other cells. As such, the polysilicon resistor 923 can provide a resistance that constitutes a first portion of the RC delay of the RC delay cell 500; the polysilicon resistor 923, the dummy gate dielectric 921, and the substrate 901 (which includes the active regions 902 and 904) can collectively provide a capacitance that constitutes a second portion of the RC delay; the contact 930 can provide a resistance that constitutes a third portion of the RC delay; and the contact 940 can provide a resistance that constitutes a fourth portion of the RC delay.

In various embodiments, the first, third, and fourth portions may be significantly greater than the second portion, and thus, the RC delay of the RC delay cell 500 may be dominated by the resistances of the polysilicon resistor 923, and the contacts 930-940. Further, the resistances of the polysilicon resistor 923 and the contacts 930-940 may vary with their respective dimensions. For example in FIGS. 5 and 9, a portion of the polysilicon resistor 923 (gate feature 520) between the contacts 930-940 has a length (along the Y direction), L, a width (along the X direction), W, and a height, H (along the Z direction). The first portion of the RC delay can vary with the values of L, W, and H. Similarly, the second portion and third portion of the RC delay can vary with the dimensions of the contacts 930 and 940, respectively. Still further, the resistances of the polysilicon resistor 923 and the contacts 930-940 may vary with their respective conduction characteristics. For example, the first portion of the RC delay can vary with a conductivity of the polysilicon resistor 923, which may be adjusted by doping the polysilicon resistor 923 in different concentrations, or changing the material of the polysilicon resistor 923. In another example, the second and third portions of the RC delay can vary with conductivities of the contacts 930 and 940, respectively, which may be adjusted by changing the material of the contacts 930 and 940.

Figure 6:
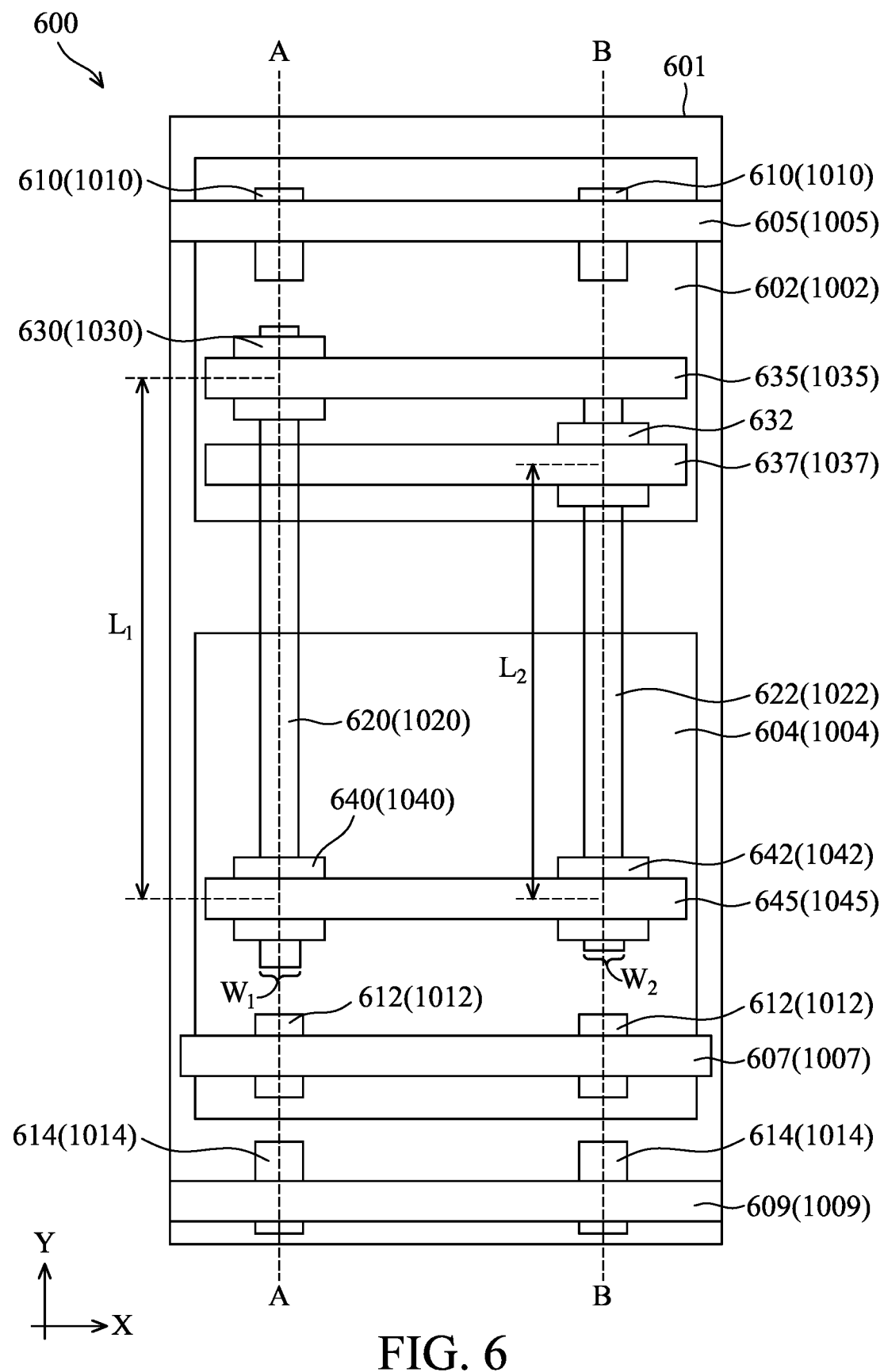
Figure 10:
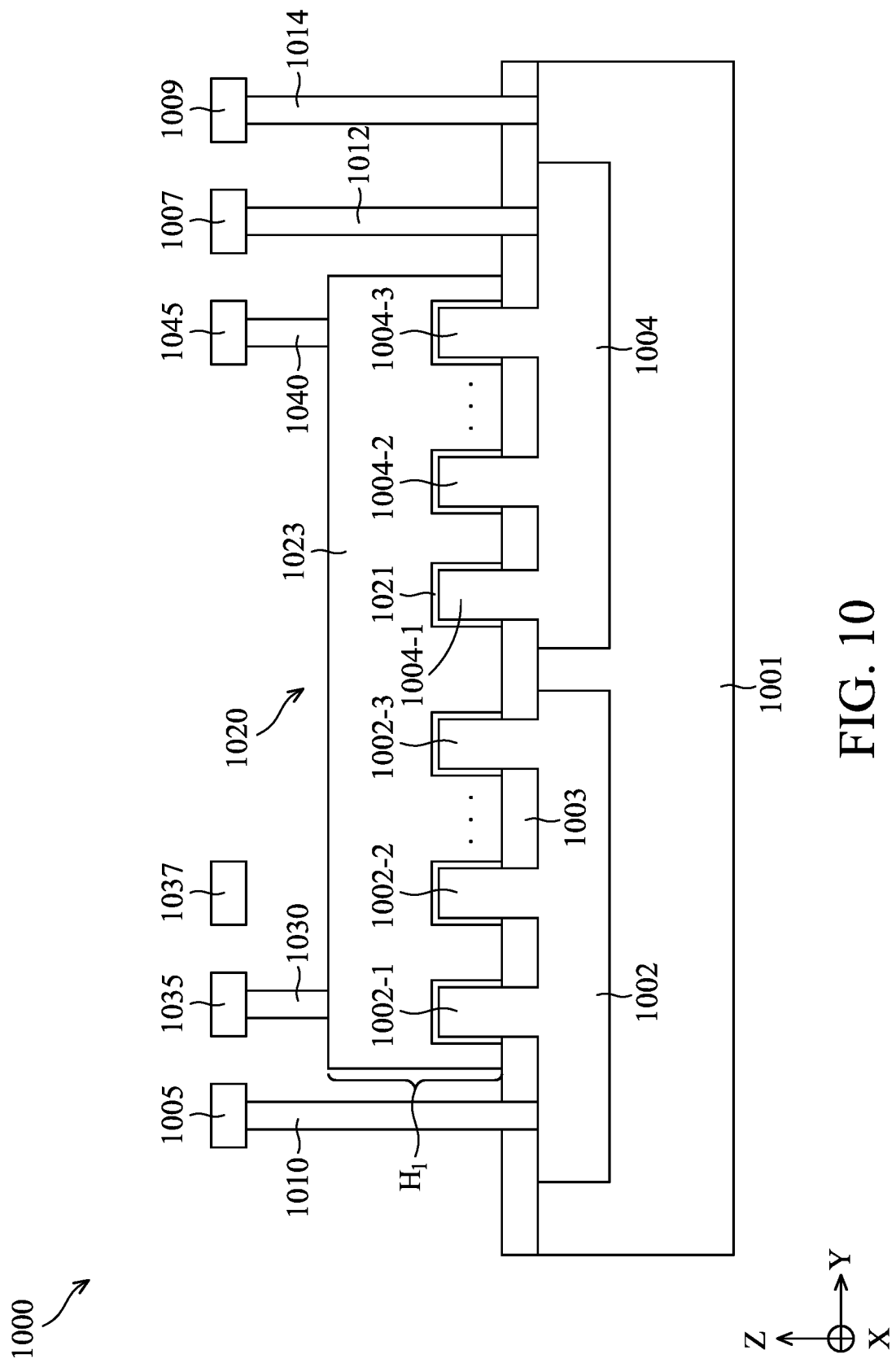
Figure 11:
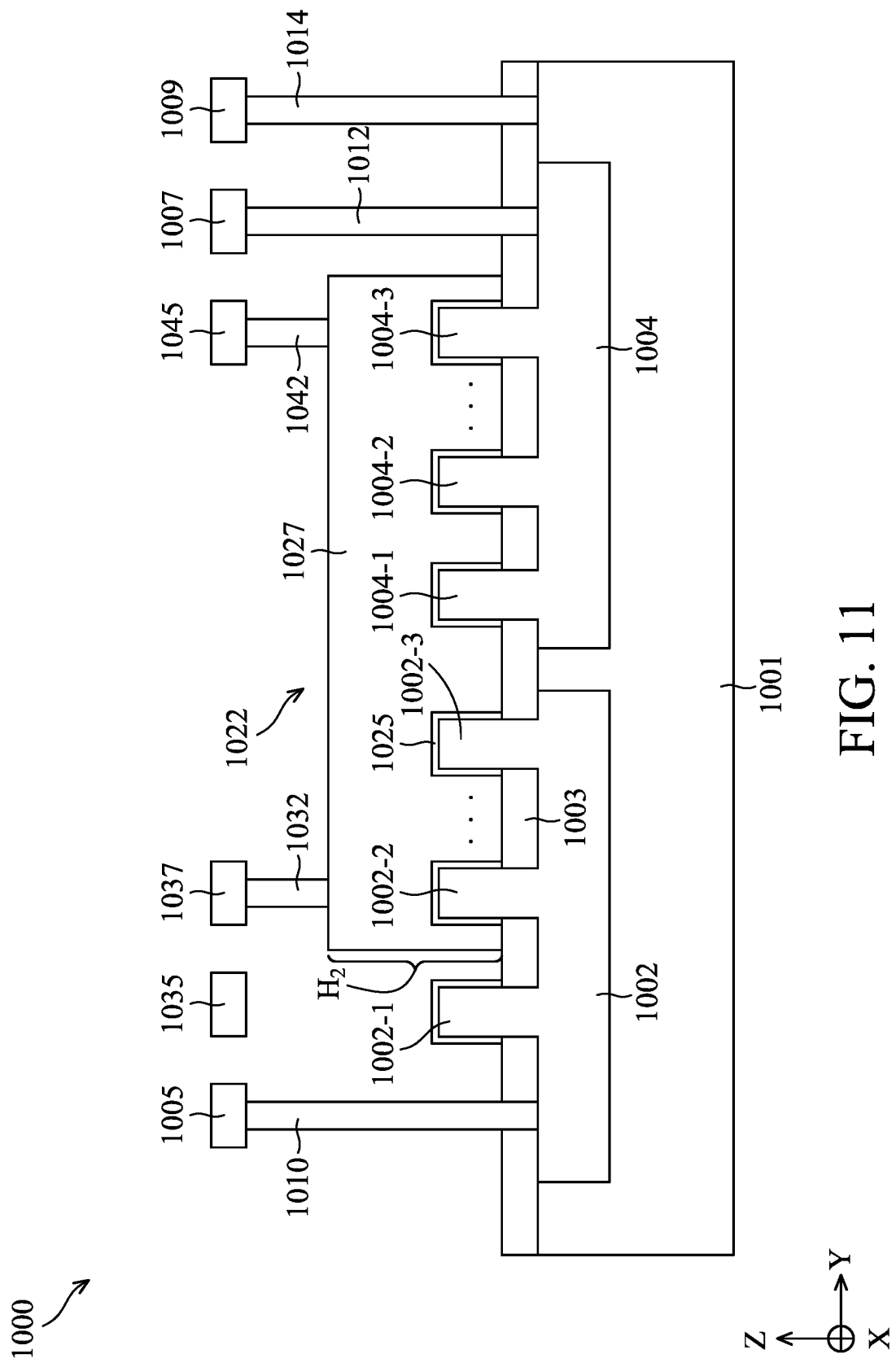

Referring to FIG. 6, the layout of another RC delay cell 600 is depicted, in accordance with various embodiments. The layout of the RC delay cell 600 includes various features, each of which corresponds to one or more patterning process (e.g., a photolithography process) to make one or more physical device features. Some of the physical device features are shown in the cross-sectional views of FIG. 10-11 where an example device 1000 is fabricated based on the layout of FIG. 6 (e.g., by adopting a FinFET technology). The cross-sectional views of FIG. 10-11 are cut along A-A direction and B-B direction, respectively, as indicated in FIG. 6. Hereinafter, the layout of the RC delay cell 600 of FIG. 6 may sometimes be discussed in conjunction with FIGS. 10-11.

For example, the layout includes a feature 601 that defines a boundary of the RC delay cell 600 (hereinafter cell boundary 601). The cell boundary 601 may have a cell height (along the Y direction), which may be equal to the cell height A or the cell height B, as described above. The cell boundary 601 may correspond to an area over a substrate 1001. Over the cell boundary 601, the layout includes active features, 602 and 604, separated from each other along the Y direction. The active feature 602 may be configured to define a first active region with a first conduction type (e.g., n-type), 1002 in FIGS. 10-11 (hereinafter active region 1002). The active feature 604 may be configured to define a second active region with a second conduction type (e.g., p-type), 1004 in FIGS. 10-11 (hereinafter active region 1004). Although the active feature 602 and 604 (and corresponding active regions 1002 and 1004) are formed separated apart from each other, e.g., by an isolation region (not shown), it should be understood that such two features/regions can be formed abutted to each other while remaining within the scope of the present disclosure.

In various embodiments, the active regions 1002-1004 may define the footprint of one or more channel structures. The channel structures of the RC delay cell 600 may not include source/drain structures, and thus, the channel structures may not be configured to conduct currents. These channel structures of the RC delay cell 600 may be concurrently formed with respective channel structures of the transistor-based cells that are used to form the sequential devices 414-416 and combinational logics 405-411 (shown in FIG. 4), but masked out during certain process steps (e.g., the step of forming source/drain structures for the transistor-based cells). These channel structures may each be formed as a fin structure protruding from the substrate 1001, while various other structures (e.g., a set of nanostructures vertically separated from each other) may be possible. For example in FIG. 10, a number of fin structures 1002-1, 1002-2, and 1002-3 are formed over the first active region 1002, and a number of fin structures 1004-1, 1004-2, and 1004-3 are formed over the second active region 1004. The neighboring fin structures may be separated (e.g., electrically isolated) from each other by one or more isolation regions (e.g., shallow trench isolations (STIs)) 1003. Although three fin structures are shown over the active region each, it should be understood that any number of fin structures can be formed in each of the active regions.

Referring again to FIG. 6 (and in conjunction with FIGS. 10-11), over the active feature 602, the layout includes one or more contact features 610 configured to define bulk (or body) contacts 1010. The bulk contacts 1010 are configured to electrically connect the first active region 1002 to an interconnecting structure 1005, which can be formed based on an interconnecting feature 605. Over the active feature 604, the layout includes one or more contact features 612 configured to define bulk (or body) contacts 1012. The bulk contacts 1012 are configured to electrically connect the second active region 1004 to an interconnecting structure 1007, which can be formed based on an interconnecting feature 607. Adjacent to the active feature 604 (opposite to the active feature 602), the layout includes one or more contact features 614 configured to define bulk (or body) contacts 1014. The bulk contacts 1014 are configured to electrically connect the substrate 1001 to an interconnecting structure 1009, which can be formed based on an interconnecting feature 609. In the example where the first active region 1002 includes n-type dopants and the second active region 1004 includes p-type dopants, the interconnecting structure 1005 may include or be coupled to a first power rail configured to provide a first power supply, VDD, and the interconnecting structure 1007/1009 may include or be coupled to a second power rail configured to provide a second power supply, VSS (or ground).

In various embodiments, the layout of the RC delay cell 600 includes a first gate feature 620 and a second gate feature 622, each of which extends along the Y direction and crosses over a portion of each of the active features 1002-1004. The gate feature 620 may be configured to define a dummy gate structure 1020 over the channel structures formed in the active regions 1002 and 1004, respectively, as shown in FIG. 10. Similarly, the gate feature 622 may be configured to define a dummy gate structure 1022, in parallel with the dummy gate structure 1020, over some of the channel structures formed in the active regions 1002 and 1004, respectively, as shown in FIG. 11. In some embodiments, the dummy gate structure 1020 includes a dummy gate dielectric 1021 overlaying (a portion of) the fin structures 1002-1-3 and 1004-1-3 and a dummy gate 1023 overlaying the dummy gate dielectric 1021; and the dummy gate structure 1022 includes a dummy gate dielectric 1025 overlaying (a portion of) the fin structures 1002-2-3 and 1004-1-3 and a dummy gate 1027 overlaying the dummy gate dielectric 1025. The dummy gate structures 1020 and 1022 of the RC delay cell 600 may be concurrently formed with respective dummy gate structures of the transistor-based cells that are used to form the sequential devices 414-416 and combinational logics 405-411 (shown in FIG.

4), but masked out during certain process steps (e.g., the step of replacing the dummy gate structures for the transistor-based cells).

In various embodiments, the dummy gates 1023 and 1027 may each include polysilicon, which can form a respective polysilicon resistor (hereinafter polysilicon resistor 1023 and polysilicon resistor 1027). The dummy gates 1023 and 1027 may include non-doped or doped polysilicon, and the dummy gate dielectrics 1021 and 1025 may include a high-k dielectric material layer. The dummy gates 1023 and 1027 alternatively or additionally may include amorphous silicon. The high-k dummy gate dielectrics 1021 and 1025 may include a dielectric material having the dielectric constant higher than that of thermal silicon oxide, which is about 3.9. In one example, the high-k dummy gate dielectrics 1021 and 1025 include hafnium oxide (HfO). In various examples, the high-k dummy gate dielectrics 1021 and 1025 include metal oxide, metal nitride, or combinations thereof. Although in the illustrated embodiment of FIGS. 6 and 10-11, the polysilicon resistors 1023 and 1027 are each formed over one or more active regions (e.g., 1002, 1004), it should be understood that the polysilicon resistors 1023 and 1027 can each be formed over non-active regions of the substrate while remaining within the scope of the present disclosure. For example, the polysilicon resistors 1023 and 1027 can each be formed in an isolation region (e.g., a shallow trench isolation (STI)) of the substrate 1001.

In various embodiments, the layout of the RC delay cell 600 includes contact features, 630 and 640, disposed on the ends of the gate feature 620, which can be used to define contacts, 1030 and 1040, as shown in FIG. 10; and layout of the RC delay cell 600 includes contact features, 632 and 642, disposed on the ends of the gate feature 622, which can be used to define contacts, 1032 and 1042, as shown in FIG. 11. The contacts 1030 and 1040 may be configured to electrically connect the polysilicon resistor 1023 to interconnecting structures, 1035 and 1045, which can be defined by interconnecting features 635 and 645, respectively; and the contacts 1032 and 1042 may be configured to electrically connect the polysilicon resistor 1027 to interconnecting structures, 1037 and 1045, which can be defined by interconnecting features 637 and 645, respectively. The interconnecting structures 1035 and 1037 can respectively function as input/output ports that enables the RC delay cell 600 to electrically couple to other cells. As such, the polysilicon resistor 1023 can provide a resistance that constitutes a first portion of the RC delay of the RC delay cell 600; the polysilicon resistor 1027 can provide a resistance that constitutes a second portion of the RC delay; the polysilicon resistors 1023-1027, the dummy gate dielectrics 1021-1025, and the substrate 1001 (which includes the active regions 1002 and 1004) can collectively provide a capacitance that constitutes a third portion of the RC delay; the contact 1030 can provide a resistance that constitutes a fourth portion of the RC delay; the contact 1040 can provide a resistance that constitutes a fifth portion of the RC delay; the contact 1042 can provide a resistance that constitutes a sixth portion of the RC delay; and the contact 1032 can provide a resistance that constitutes a seventh portion of the RC delay.

In various embodiments, the first, second, fourth, fifth, sixth, and seventh portions may be significantly greater than the third portion, and thus, the RC delay of the RC delay cell 600 may be dominated by the resistances of the polysilicon resistors 1023-1027, and the contacts 1030, 1040, 1032, and 1042. Further, the resistances of the polysilicon resistors 1023 and 1027 and the contacts 1030, 1040, 1032, and 1042 may vary with their respective dimensions. For example in FIGS. 6 and 10-11, a portion of the polysilicon resistor 1023 (gate feature 620) between the contacts 1030-1040 has a length (along the Y direction), $L_1$, a width (along the X direction), $W_1$, and a height, $H_1$ (along the Z direction); and a portion of the polysilicon resistor 1027 (gate feature 622) between the contacts 1032-1042 has a length (along the Y direction), $L_2$, a width (along the X direction), $W_2$, and a height, $H_2$ (along the Z direction). The first portion of the RC delay can vary with the values of $L_1$, $W_1$, and $H_1$ and the second portion of the RC delay can vary with the values of $L_2$, $W_2$, and $H_2$. Similarly, the fourth, fifth, sixth, and seventh portions of the RC delay can vary with the dimensions of the contacts 1030, 1040, 1032, and 1042, respectively. Still further, the resistances of the polysilicon resistors 1023 and 1027 and the contacts 1030, 1040, 1032, and 1042 may vary with their respective conduction characteristics. For example, the first portion of the RC delay can vary with a conductivity of the polysilicon resistor 1023, which may be adjusted by doping the polysilicon resistor 1023 in different concentrations, or changing the material of the polysilicon resistor 1023. In another example, the fourth, fifth, sixth, and seventh portions of the RC delay can vary with conductivities of the contacts 1030, 1040, 1032, and 1042, respectively, which may be adjusted by changing the material of the contacts 1030, 1040, 1032, and 1042.

Figure 7:
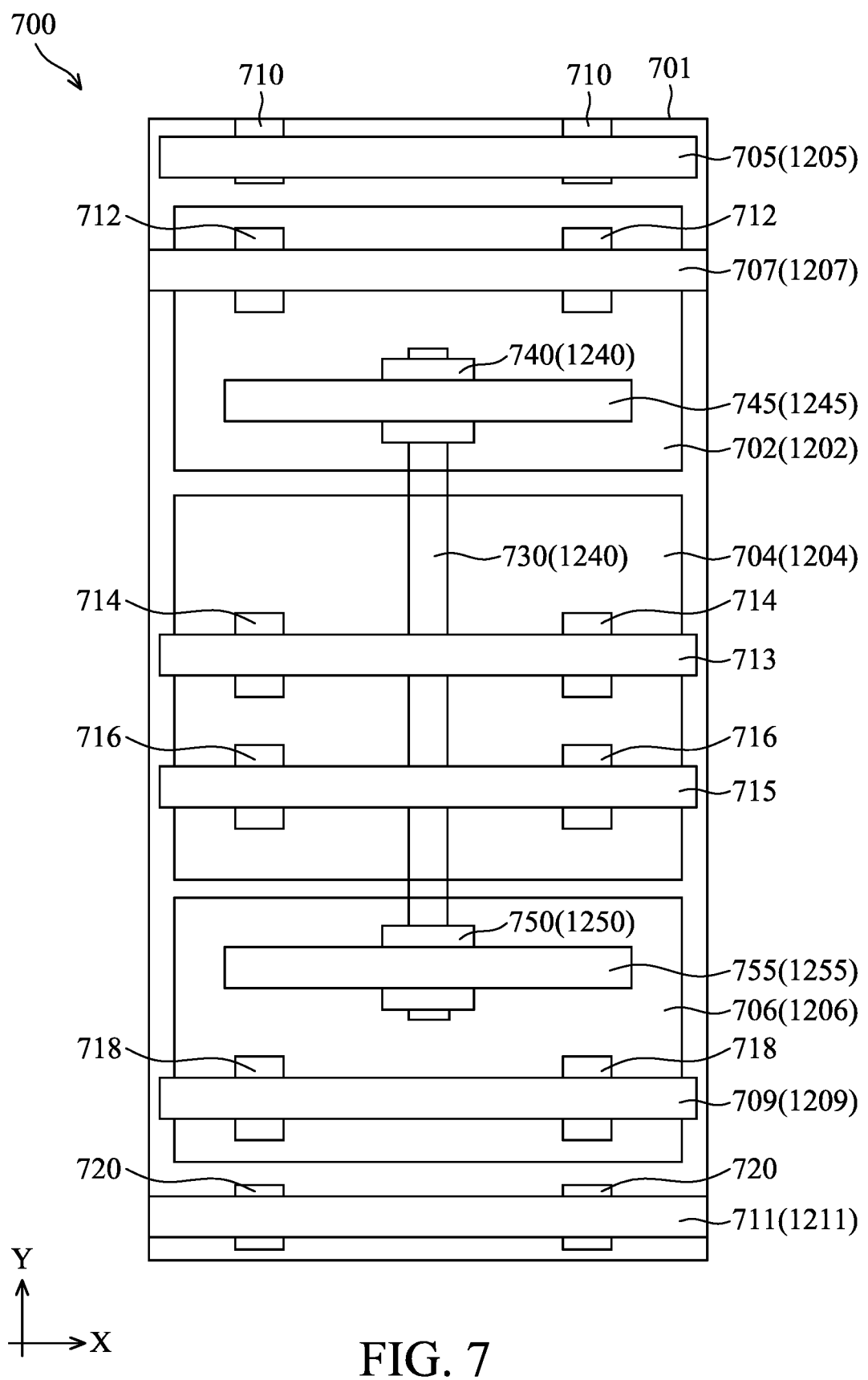
Figure 12:
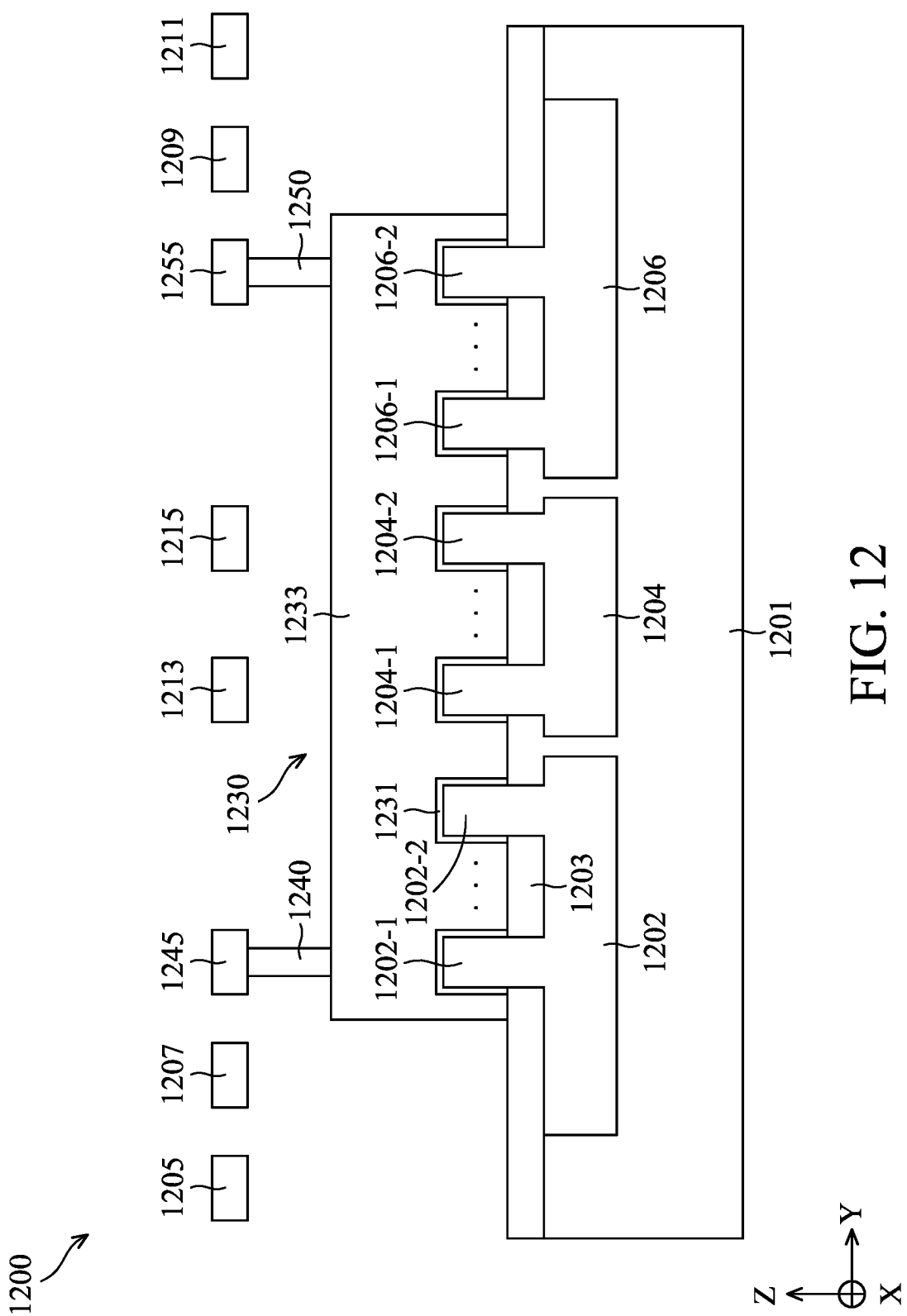

Referring to FIG. 7, the layout of yet another RC delay cell 700 is depicted, in accordance with various embodiments. The layout of the RC delay cell 700 includes various features, each of which corresponds to one or more patterning process (e.g., a photolithography process) to make one or more physical device features. Some of the physical device features are shown in the cross-sectional view of FIG. 12 where an example device 1200 is fabricated based on the layout of FIG. 7 (e.g., by adopting a FinFET technology). The cross-sectional view of FIG. 12 is cut along A-A direction as indicated in FIG. 7. Hereinafter, the layout of the RC delay cell 700 of FIG. 7 may sometimes be discussed in conjunction with FIG. 12.

For example, the layout includes a feature 701 that defines a boundary of the RC delay cell 700 (hereinafter cell boundary 701). The cell boundary 701 may have a cell height (along the Y direction), which may be equal to two times the cell height A or two times the cell height B, as described above. The cell boundary 701 may correspond to an area over a substrate 1201. Over the cell boundary 701, the layout 700 includes active features, 702, 704, and 706, separated from each other along the Y direction. The active feature 702 may be configured to define a first active region with a first conduction type (e.g., p-type), 1202 in FIG. 12 (hereinafter active region 1202). The active feature 704 may be configured to define a second active region with a second conduction type (e.g., n-type), 1204 in FIG. 12 (hereinafter active region 1204). The active feature 706 may be configured to define a third active region with the first conduction type (e.g., p-type), 1206 in FIG. 12 (hereinafter active region 1206). Although the active feature 702-706 (and corresponding active regions 1202-1206) are formed separated apart from each other, e.g., by an isolation region (not shown), it should be understood that such three features/regions can be formed abutted to each other while remaining within the scope of the present disclosure.

In various embodiments, the active regions 1202-1206 may define the footprint of one or more channel structures. The channel structures of the RC delay cell 700 may not include source/drain structures, and thus, the channel structures may not be configured to conduct currents. These channel structures of the RC delay cell 700 may be concurrently formed with respective channel structures of the transistor-based cells that are used to form the sequential devices 414-416 and combinational logics 405-411 (shown in FIG. 4), but masked out during certain process steps (e.g., the step of forming source/drain structures for the transistor-based cells). These channel structures may each be formed as a fin structure protruding from the substrate 1201, while various other structures (e.g., a set of nanostructures vertically separated from each other) may be possible. For example in FIG. 12, a number of fin structures 1202-1 and 1202-2 are formed over the first active region 1202, a number of fin structures 1204-1 and 1204-2 are formed over the second active region 1204, and a number of fin structures 1206-1 and 1206-2 are formed over the third active region 1206. The neighboring fin structures may be separated (e.g., electrically isolated) from each other by one or more isolation regions (e.g., shallow trench isolations (STIs)) 1203. Although two fin structures are shown over the active region each, it should be understood that any number of fin structures can be formed in each of the active regions. In some embodiments, the number of fin structures formed over the active region 1204 may be two times the number of fin structures formed in either one of the active regions 1202 and 1206.

Referring again to FIG. 7 (and in conjunction with FIG. 12), over the active feature 702, the layout includes one or more contact features 712 configured to define bulk (or body) contacts. The bulk contacts are configured to electrically connect the first active region 1202 to an interconnecting structure 1207, which can be formed based on an interconnecting feature 707. Adjacent to the active feature 702 (opposite to the active feature 704), the layout includes one or more contact features 710 configured to define bulk (or body) contacts. The bulk contacts are configured to electrically connect the substrate 1201 to an interconnecting structure 1205, which can be formed based on an interconnecting feature 705. Over the active feature 704, the layout includes one or more contact features 714-716 configured to define bulk (or body) contacts. The bulk contacts are configured to electrically connect the second active region 1204 to interconnecting structures 1213 and 1215, which can be formed based on an interconnecting features 713 and 715, respectively. Over the active feature 706, the layout includes one or more contact features 718 configured to define bulk (or body) contacts. The bulk contacts are configured to electrically connect the third active region 1206 to an interconnecting structure 1209, which can be formed based on an interconnecting feature 709. Adjacent to the active feature 706 (opposite to the active feature 704), the layout includes one or more contact features 720 configured to define bulk (or body) contacts. The bulk contacts are configured to electrically connect the substrate 1201 to an interconnecting structure 1211, which can be formed based on an interconnecting feature 711. In the example where the second active region 1204 includes n-type dopants and the first and third active regions 1202 and 1206 include p-type dopants, the interconnecting structures 1213-1215 may include or be coupled to a first power rail configured to provide a first power supply, VDD, and the interconnecting structures 1205, 1207, 1209, and 1211 may include or be coupled to a second power rail configured to provide a second power supply, VSS (or ground).

In various embodiments, the layout of the RC delay cell 700 includes a gate feature 730 that extends along the Y direction and crosses over a portion of each of the active features 702-706. The gate feature 730 may be configured to define a dummy gate structure 1230 over the channel structures formed in the active regions 1202-1206, respectively, as shown in FIG. 12. In some embodiments, the dummy gate structure 1230 includes a dummy gate dielectric 1231 overlaying (a portion of) the fin structures 1202-1-2, 1204-1-2, and 1206-1-2 and a dummy gate 1233 overlaying the dummy gate dielectric 1231. The dummy gate structure 1230 of the RC delay cell 700 may be concurrently formed with respective dummy gate structures of the transistor-based cells that are used to form the sequential devices 414-416 and combinational logics 405-411 (shown in FIG. 4), but masked out during certain process steps (e.g., the step of replacing the dummy gate structures for the transistor-based cells).

In various embodiments, the dummy gate 1233 include polysilicon, which can form a polysilicon resistor (hereinafter polysilicon resistor 1233). The dummy gate 1233 may include non-doped or doped polysilicon, and the dummy gate dielectric 1231 may include a high-k dielectric material layer. The dummy gate 1233 alternatively or additionally may include amorphous silicon. The high-k dummy gate dielectric 1231 may include a dielectric material having the dielectric constant higher than that of thermal silicon oxide, which is about 3.9. In one example, the high-k dummy gate dielectric 1231 includes hafnium oxide (HfO). In various examples, the high-k dummy gate dielectric 1231 includes metal oxide, metal nitride, or combinations thereof. Although in the illustrated embodiment of FIGS. 7 and 12, the polysilicon resistor 1233 is formed over one or more active regions (e.g., 1202, 1204, 1206), it should be understood that the polysilicon resistor 1233 can be formed over non-active regions of the substrate while remaining within the scope of the present disclosure. For example, the polysilicon resistor 1233 can be formed in an isolation region (e.g., a shallow trench isolation (STI)) of the substrate 1201.

In various embodiments, the layout of the RC delay cell 700 includes contact features, 740 and 750, disposed on the ends of the gate feature 730, which can be used to define contacts, 1240 and 1250, as shown in FIG. 12. The contacts 1240 and 1250 may be configured to electrically connect the polysilicon resistor 1233 to interconnecting structures, 1245 and 1255, which can be defined by interconnecting features 745 and 755, respectively. The interconnecting structures 1245 and 1255 can respectively function as input/output ports that enables the RC delay cell 700 to electrically couple to other cells. As such, the polysilicon resistor 1233 can provide a resistance that constitutes a first portion of the RC delay of the RC delay cell 700; the polysilicon resistor 1233, the dummy gate dielectric 1231, and the substrate 1201 (which includes the active regions 1202-1206) can collectively provide a capacitance that constitutes a second portion of the RC delay; the contact 1240 can provide a resistance that constitutes a third portion of the RC delay; and the contact 1250 can provide a resistance that constitutes a fourth portion of the RC delay.

In various embodiments, the first, third, and fourth portions may be significantly greater than the second portion, and thus, the RC delay of the RC delay cell 700 may be dominated by the resistances of the polysilicon resistor 1233, and the contacts 1240-1250. Further, the resistances of the polysilicon resistor 1233 and the contacts 1240-1250 may vary with their respective dimensions. For example in FIGS. 7 and 12, a portion of the polysilicon resistor 1233 (gate feature 730) between the contacts 1240-1250 has a length (along the Y direction), L, a width (along the X direction), W, and a height, H (along the Z direction). The first portion of the RC delay can vary with the values of L, W, and H. Similarly, the second portion and third portion of the RC delay can vary with the dimensions of the contacts 1240 and 1250, respectively. Still further, the resistances of the polysilicon resistor 1233 and the contacts 1240-1250 may vary with their respective conduction characteristics. For example, the first portion of the RC delay can vary with a conductivity of the polysilicon resistor 1233, which may be adjusted by doping the polysilicon resistor 1233 in different concentrations, or changing the material of the polysilicon resistor 1233. In another example, the second and third portions of the RC delay can vary with conductivities of the contacts 1240 and 1250, respectively, which may be adjusted by changing the material of the contacts 1240 and 1250.

Figure 8:
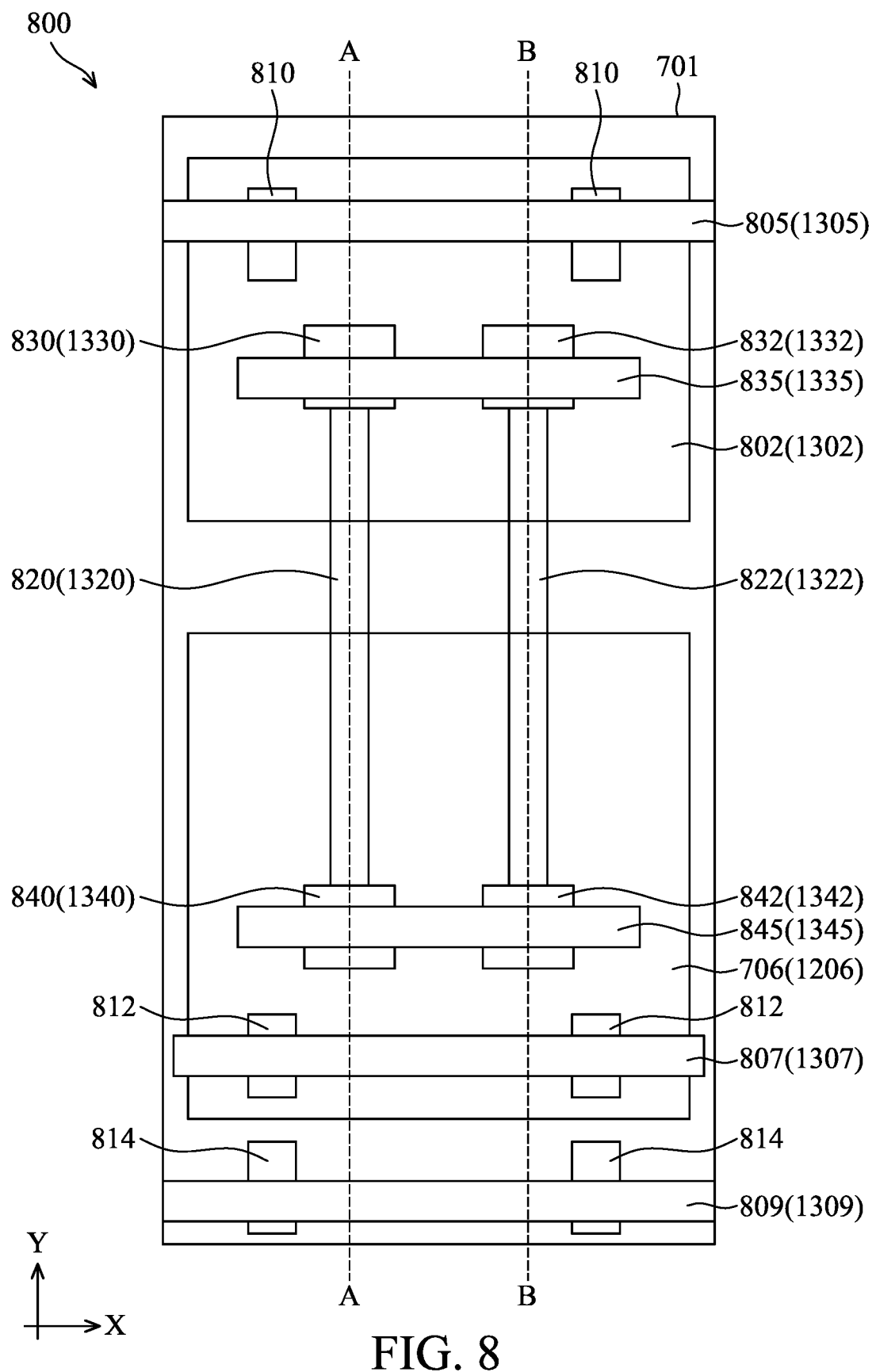
Figure 13:
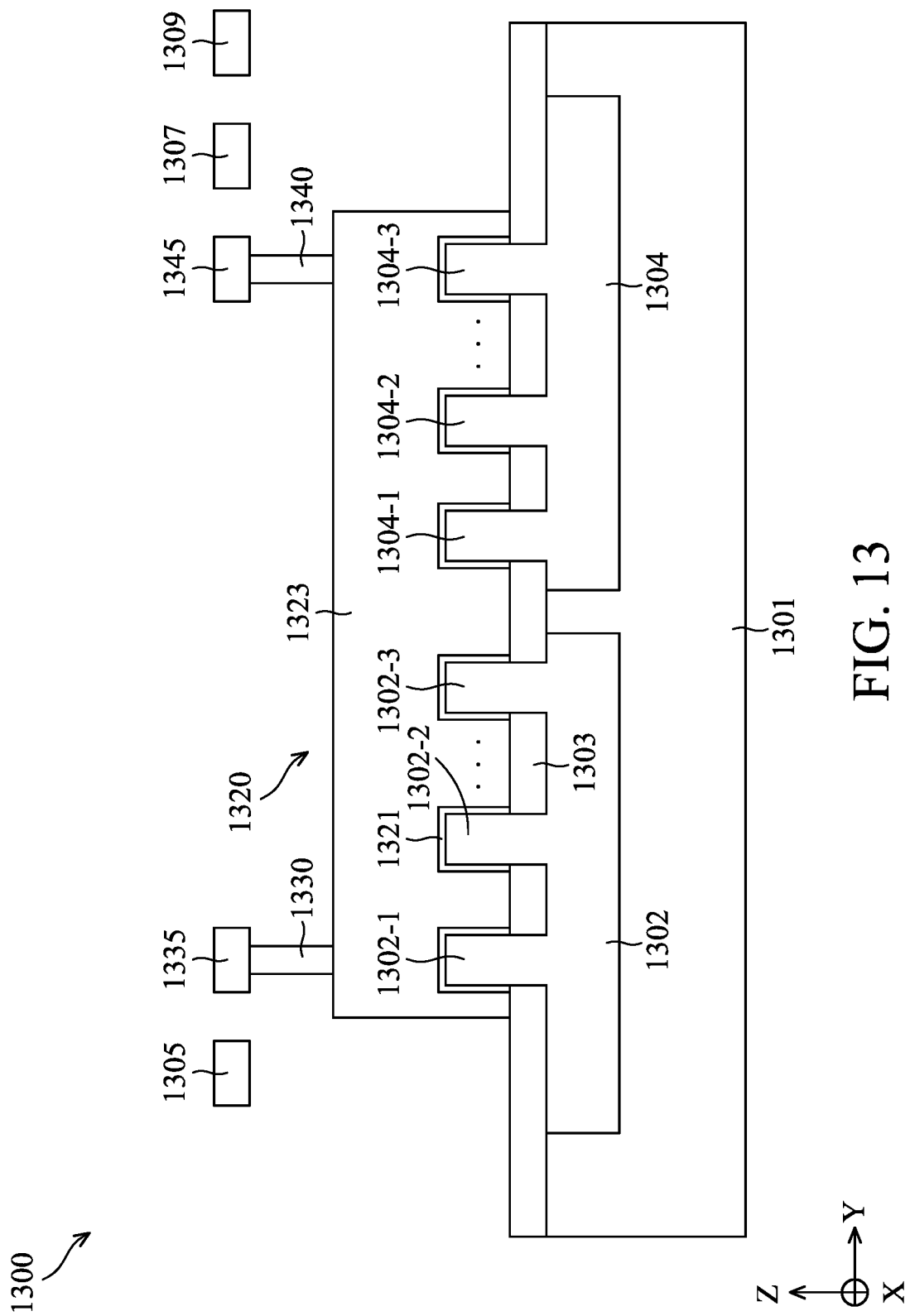
Figure 14:
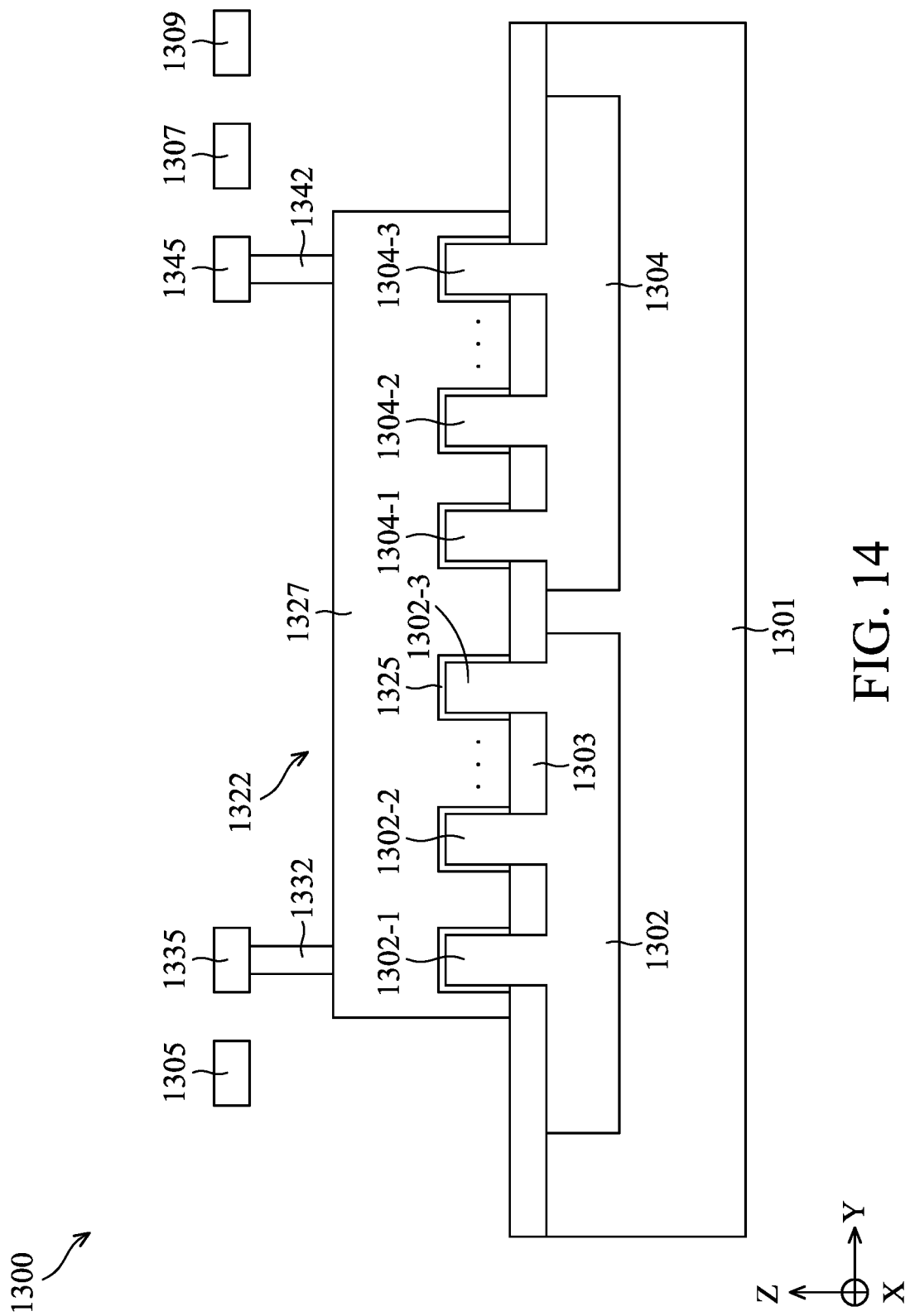

Referring to FIG. 8, the layout of yet another RC delay cell 800 is depicted, in accordance with various embodiments. The layout of the RC delay cell 800 includes various features, each of which corresponds to one or more patterning process (e.g., a photolithography process) to make one or more physical device features. Some of the physical device features are shown in the cross-sectional views of FIG. 13-14 where an example device 1300 is fabricated based on the layout of FIG. 8 (e.g., by adopting a FinFET technology). The cross-sectional views of FIG. 13-14 are cut along A-A direction and B-B direction, respectively, as indicated in FIG. 8. Hereinafter, the layout of the RC delay cell 800 of FIG. 8 may sometimes be discussed in conjunction with FIGS. 13-14.

For example, the layout includes a feature 801 that defines a boundary of the RC delay cell 800 (hereinafter cell boundary 801). The cell boundary 801 may have a cell height (along the Y direction), which may be equal to the cell height A or the cell height B, as described above. The cell boundary 801 may correspond to an area over a substrate 1301. Over the cell boundary 801, the layout includes active features, 802 and 804, separated from each other along the Y direction. The active feature 802 may be configured to define a first active region with a first conduction type (e.g., n-type), 1302 in FIGS. 13-14 (hereinafter active region 1302). The active feature 804 may be configured to define a second active region with a second conduction type (e.g., p-type), 1304 in FIGS. 13-14 (hereinafter active region 1304). Although the active feature 802 and 804 (and corresponding active regions 1302 and 1304) are formed separated apart from each other, e.g., by an isolation region (not shown), it should be understood that such two features/regions can be formed abutted to each other while remaining within the scope of the present disclosure.

In various embodiments, the active regions 1302-1304 may define the footprint of one or more channel structures. The channel structures of the RC delay cell 800 may not include source/drain structures, and thus, the channel structures may not be configured to conduct currents. These channel structures of the RC delay cell 800 may be concurrently formed with respective channel structures of the transistor-based cells that are used to form the sequential devices 414-416 and combinational logics 405-411 (shown in FIG. 4), but masked out during certain process steps (e.g., the step of forming source/drain structures for the transistor-based cells). These channel structures may each be formed as a fin structure protruding from the substrate 1301, while various other structures (e.g., a set of nanostructures vertically separated from each other) may be possible. For example in FIG. 13, a number of fin structures 1302-1, 1302-2, and 1302-3 are formed over the first active region 1302, and a number of fin structures 1304-1, 1304-2, and 1304-3 are formed over the second active region 1304. The neighboring fin structures may be separated (e.g., electrically isolated) from each other by one or more isolation regions (e.g., shallow trench isolations (STIs)) 1303. Although three fin structures are shown over the active region each, it should be understood that any number of fin structures can be formed in each of the active regions.

Referring again to FIG. 8 (and in conjunction with FIGS. 13-14), over the active feature 1302, the layout includes one or more contact features 810 configured to define bulk (or body) contacts. The bulk contacts are configured to electrically connect the first active region 1302 to an interconnecting structure 1305, which can be formed based on an interconnecting feature 805. Over the active feature 1304, the layout includes one or more contact features 812 configured to define bulk (or body) contacts. The bulk contacts are configured to electrically connect the second active region 1304 to an interconnecting structure 1307, which can be formed based on an interconnecting feature 807. Adjacent to the active feature 1304 (opposite to the active feature 1302), the layout includes one or more contact features 814 configured to define bulk (or body) contacts. The bulk contacts are configured to electrically connect the substrate 1301 to an interconnecting structure 1309, which can be formed based on an interconnecting feature 809. In the example where the first active region 1302 includes n-type dopants and the second active region 1304 includes p-type dopants, the interconnecting structure 1305 may include or be coupled to a first power rail configured to provide a first power supply, VDD, and the interconnecting structure 1307/1309 may include or be coupled to a second power rail configured to provide a second power supply, VSS (or ground).

In various embodiments, the layout of the RC delay cell 800 includes a first gate feature 820 and a second gate feature 822, each of which extends along the Y direction and crosses over a portion of each of the active features 1302-1304. The gate feature 820 may be configured to define a dummy gate structure 1320 over the channel structures formed in the active regions 1302 and 1304, respectively, as shown in FIG. 13. Similarly, the gate feature 822 may be configured to define a dummy gate structure 1322, in parallel with the dummy gate structure 1320, over some of the channel structures formed in the active regions 1302 and 1304, respectively, as shown in FIG. 14. In some embodiments, the dummy gate structure 1320 includes a dummy gate dielectric 1321 overlaying (a portion of) the fin structures 1302-1-3 and 1304-1-3 and a dummy gate 1323 overlaying the dummy gate dielectric 1321; and the dummy gate structure 1322 includes a dummy gate dielectric 1325 overlaying (a portion of) the fin structures 1302-1-3 and 1304-1-3 and a dummy gate 1327 overlaying the dummy gate dielectric 1325. The dummy gate structures 1320 and 1322 of the RC delay cell 800 may be concurrently formed with respective dummy gate structures of the transistor-based cells that are used to form the sequential devices 414-416 and combinational logics 405-411 (shown in FIG. 4), but masked out during certain process steps (e.g., the step of replacing the dummy gate structures for the transistor-based cells).

In various embodiments, the dummy gates 1323 and 1327 may each include polysilicon, which can form a respective polysilicon resistor (hereinafter polysilicon resistor 1323 and polysilicon resistor 10327). The dummy gates 1323 and 1327 may include non-doped or doped polysilicon, and the dummy gate dielectrics 1321 and 1325 may include a high-k dielectric material layer. The dummy gates 1323 and 1327 alternatively or additionally may include amorphous silicon. The high-k dummy gate dielectrics 1321 and 1325 may include a dielectric material having the dielectric constant higher than that of thermal silicon oxide, which is about 3.9. In one example, the high-k dummy gate dielectrics 1321 and 1325 include hafnium oxide (HfO). In various examples, the high-k dummy gate dielectrics 1321 and 1325 include metal oxide, metal nitride, or combinations thereof. Although in the illustrated embodiment of FIGS. 8 and 13-14, the polysilicon resistors 1323 and 1327 are each formed over one or more active regions (e.g., 1302, 1304), it should be understood that the polysilicon resistors 1323 and 1327 can each be formed over non-active regions of the substrate while remaining within the scope of the present disclosure. For example, the polysilicon resistors 1323 and 1327 can each be formed in an isolation region (e.g., a shallow trench isolation (STI)) of the substrate 1301.

In various embodiments, the layout of the RC delay cell 800 includes contact features, 830 and 840, disposed on the ends of the gate feature 820, which can be used to define contacts, 1330 and 1340, as shown in FIG. 13; and layout of the RC delay cell 800 includes contact features, 832 and 842, disposed on the ends of the gate feature 822, which can be used to define contacts, 1332 and 1342, as shown in FIG. 14. The contacts 1330 and 1340 may be configured to electrically connect the polysilicon resistor 1323 to interconnecting structures, 1335 and 1345, which can be defined by interconnecting features 835 and 845, respectively; and the contacts 1332 and 1342 may be configured to electrically connect the polysilicon resistor 1327 to the same interconnecting structures 1335 and 1345. The interconnecting structures 1335 and 1337 can respectively function as input/output ports that enables the RC delay cell 800 to electrically couple to other cells. As such, the polysilicon resistors 1323 and 1327, connected in parallel, can collectively provide an equivalent resistance (e.g., a half of the resistance of the polysilicon resistors 1323 and 1327) that constitutes a first portion of the RC delay of the RC delay cell 800; the polysilicon resistors 1323-1327, the dummy gate dielectrics 1321-1325, and the substrate 1301 (which includes the active regions 1302 and 1304) can collectively provide a capacitance that constitutes a second portion of the RC delay; one of the contacts 1330 and 1332 can provide a resistance that constitutes a third portion of the RC delay; and one of the contacts 1340 and 1342 can provide a resistance that constitutes a fourth portion of the RC delay.

In various embodiments, the first, third, and fourth portions may be significantly greater than the second portion, and thus, the RC delay of the RC delay cell 800 may be dominated by the resistances of the polysilicon resistors 1323-1327, and the contacts 1330, 1340, 1332, and 1342. Further, the resistances of the polysilicon resistors 1323 and 1327 and the contacts 1330, 1340, 1332, and 1342 may vary with their respective dimensions. For example in FIGS. 8 and 13-14, a portion of the polysilicon resistor 1323 (gate feature 820) between the contacts 1330-1340 has a length (along the Y direction), $L_1$, a width (along the X direction), $W_1$, and a height, $H_1$ (along the Z direction); and a portion of the polysilicon resistor 1327 (gate feature 822) between the contacts 1332-1342 has a length (along the Y direction), $L_2$, a width (along the X direction), $W_2$, and a height, $H_2$ (along the Z direction). The first portion of the RC delay can vary with the values of $L_1$, $W_1$, and $H_1$ and the second portion of the RC delay can vary with the values of $L_2$, $W_2$, and $H_2$. Similarly, the third, and fourth portions of the RC delay can vary with the dimensions of the contacts 1330, 10340, 1332, and 1342, respectively. Still further, the resistances of the polysilicon resistors 1323 and 1327 and the contacts 1330, 1340, 1332, and 1342 may vary with their respective conduction characteristics. For example, the first portion of the RC delay can vary with a conductivity of the polysilicon resistor 1323, which may be adjusted by doping the polysilicon resistor 1323 in different concentrations, or changing the material of the polysilicon resistor 1323. In another example, the third and fourth portions of the RC delay can vary with conductivities of the contacts 1330, 1340, 1332, and 1342, respectively, which may be adjusted by changing the material of the contacts 1330, 1340, 1332, and 1342.

Figure 15:
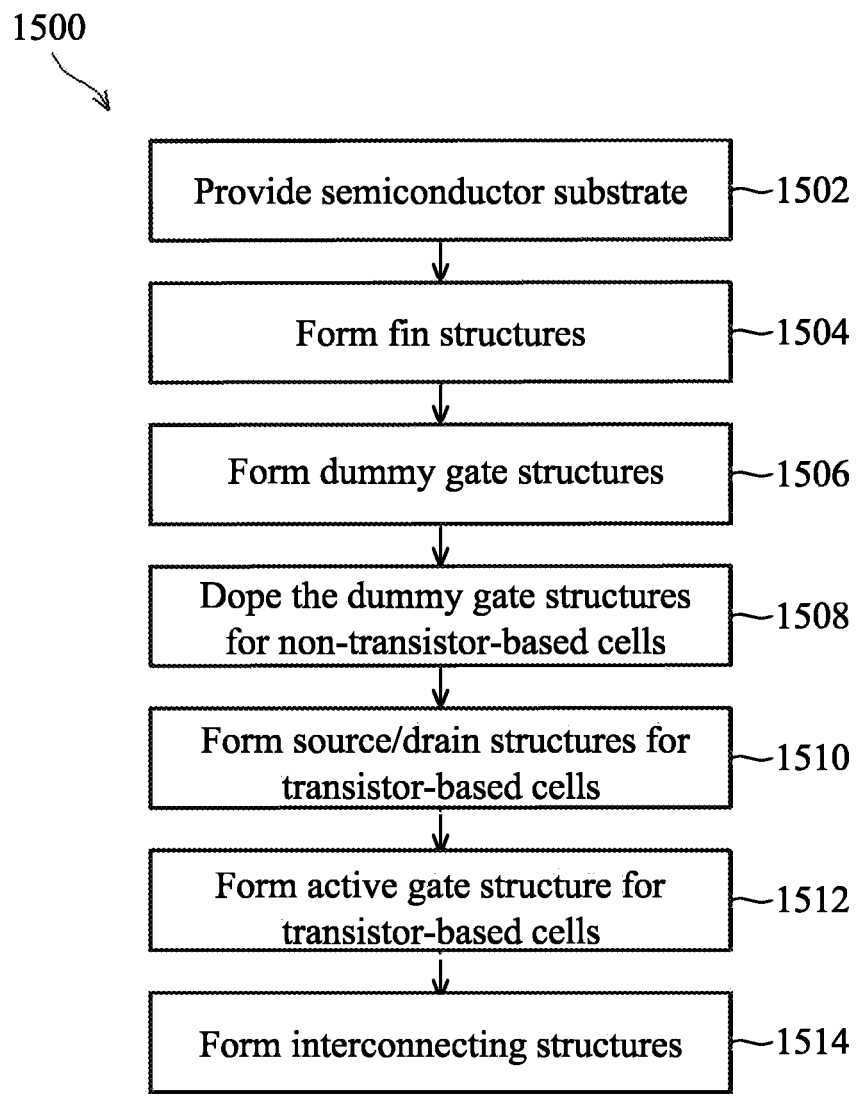
FIG. 15 illustrates a flow chart of a method to concurrently make non-transistor-based cells and transistor-based cells, in accordance with some embodiments.

FIG. 15 illustrates a flow chart of a method 1500 to concurrently make the disclosed non-transistor-based cells (e.g., RC delay cells 500-800) and transistor-based cells, according to various embodiments of the present disclosure. At least some operations of the method 1500 can be used to form the non-transistor-based cells and transistor-based cells that are each configured in a fin-like structure. For example, each of the non-transistor-based cells may be formed as including one or more fin structures (as shown in FIGS. 9-14), and each of the transistor-based cells may be formed as a FinFET device (e.g., including one or more FinFETs). However, it should be understood that the non-transistor-based cells and transistor-based cells may be each configured in any of various other structures such as, for example, a planar complementary metal-oxide-semiconductor (CMOS) structure, a gate-all-around (GAA) transistor structure, while remaining within the scope of the present disclosure.

It is noted that the method 1500 is merely an example, and is not intended to limit the present disclosure. Accordingly, it should be understood that additional operations may be provided before, during, and/or after the method 1500, and that some other operations may only be briefly described herein. Some operations of the method 1500 may be associated with cross-sectional views shown in FIGS. 10-14, and thus, the following discussions of the method 1500 may refer to one or more components of FIGS. 10-14.

In brief overview, the method 1500 starts with operation 1502 of providing a semiconductor substrate. The method 1500 proceeds to operation 1504 of forming a number of fin structures. The method 1500 proceeds to operation 1506 of forming a number of dummy gate structures. The method 1500 optionally proceeds to operation 1508 of doping some of the dummy gate structures for non-transistor-based cells. The method 1500 proceeds to operation 1510 of forming source/drain structures for transistor-based cells. The method 1500 proceeds to operation 1512 of forming active gate structures for the transistor-based cells. The method 1500 proceeds to operation 1514 of forming interconnecting structures.

Corresponding to operation 1502 (which can also refer to FIGS. 9-14), the semiconductor substrate (e.g., 901 of FIG. 9, 1001 of FIGS. 10-11, 1201 of FIG. 12, 1301 of FIGS. 13-14) may be a semiconductor substrate, such as a bulk semiconductor, a semiconductor-on-insulator (SOI) substrate, or the like, which may be doped (e.g., with a p-type or an n-type dopant) or undoped. The substrate may be a wafer, such as a silicon wafer. Generally, an SOI substrate includes a layer of a semiconductor material formed on an insulator layer. The insulator layer may be, for example, a buried oxide (BOX) layer, a silicon oxide layer, or the like. The insulator layer is provided on a substrate, typically a silicon or glass substrate. Other substrates, such as a multi-layered or gradient substrate may also be used. In some embodiments, the semiconductor material of the substrate may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In some embodiments, the substrate may have a number of areas or regions, some of which are configured to form non-transistor-based cells (hereinafter "non-transistor regions") and some of which are configured to form transistor-based cells (hereinafter "transistor regions").

Corresponding to operation 1504 (which can also refer to FIGS. 9-14), over the non-transistor regions, a number of fins (e.g., 902-1-3 and 904-1-3 of FIGS. 9, 1002-1-3 and 1004-1-3 of FIGS. 11, 1202-1-2, 1204-1-2, and 1206-1-2 of FIGS. 12, 1302-1-3 and 1304-1-3 of FIGS. 13-14) can be formed. Concurrently, over the transistor regions, a number of fins (not shown) can be formed. The fins can be formed by patterning the substrate using, for example, photolithography and etching techniques. For example, a mask layer, such as a pad oxide layer and an overlying pad nitride layer, is formed over the substrate. The pad oxide layer may be a thin film comprising silicon oxide formed, for example, using a thermal oxidation process. The pad oxide layer may act as an adhesion layer between the substrate and the overlying pad nitride layer. In some embodiments, the pad nitride layer is formed of silicon nitride, silicon oxynitride, silicon carbo nitride, the like, or combinations thereof. The pad nitride layer may be formed using low-pressure chemical vapor deposition (LPCVD) or plasma enhanced chemical vapor deposition (PECVD), for example.

Corresponding to operation 1506 (which can also refer to FIGS. 9-14), some of the dummy gate structures (e.g., 920 of FIG. 9, 1020 of FIG. 10, 1022 of FIG. 11, 1230 of FIG. 12, 1320 of FIG. 13, and 1322 of FIG. 14) can be formed over the fins in the non-transistor regions. Concurrently, some of the dummy gates (not shown) can be formed over the fins in the transistor regions. The dummy gate structures can each include a dummy gate dielectric and a dummy gate. To form the dummy gate structures, a dielectric layer is formed on the fin. The dielectric layer may be, for example, silicon oxide, silicon nitride, multilayers thereof, or the like, and may be deposited or thermally grown. A gate layer is formed over the dielectric layer, and a mask layer is formed over the gate layer. The gate layer may be deposited over the dielectric layer and then planarized, such as by a CMP. The mask layer may be deposited over the gate layer. In various embodiments of the present disclosure, the gate layer may be formed of, for example, polysilicon, although other materials may also be used. The mask layer may be formed of, for example, silicon nitride or the like. After the layers (e.g., the dielectric layer, the gate layer, and the mask layer) are formed, the mask layer may be patterned using acceptable photolithography and etching techniques to pattern the mask. The pattern of the mask then may be transferred to the gate layer and the dielectric layer by an acceptable etching technique to form the dummy gate and the underlying dummy gate dielectric, respectively.

Corresponding to optional operation 1508 (which can also refer to FIGS. 9-14), an ion implantation process is applied to the dummy gate structures in the non-transistor regions such that doping species are introduced into the dummy gate structures (which functions as resistors) and effectively change the resistance thereof. The ion implantation process (or diffusion) uses a p-type doping species, such as boron (B), to be introduced into the resistors. Alternatively, other boron-containing doping species, such as boron-difluoride (BF2), is utilized. In the ion implantation process, the doping energy is adjusted according to the thickness of the resistors such that the doping species are uniformly distributed in the resistors from the top to the bottom. Alternatively, the doping energy is adjusted such that the doping species are distributed into a portion of the resistors. After subsequent annealing process, the doping species can be uniformly distributed in the resistors. The doping dose is tuned according to the thickness of the resistors and the designed resistivity or resistance of the resistors such that the final resistivity or resistance of the resistors is within the designed region. In one embodiment, the doping concentration of the resistors is below about $5 \times 10^{18}/cm^3$. When the thickness of the resistors is about or less than 1 micron, then the doping dose is less than about $1 \times 10^{14}/cm^2$.

Corresponding to optional operation 1510, the source/drain structures can be formed in the transistor regions. While forming the source/drain structures in the transistor regions, the non-transistor regions may be covered (e.g., by a mask layer). The source/drain structures are formed in recesses of each of the fins adjacent to the dummy gate structures in the transistor regions. The recesses are formed by, e.g., an anisotropic etching process using the dummy gate structures as an etching mask, in some embodiments, although any other suitable etching process may also be used. The source/drain structures are formed by epitaxially growing a semiconductor material in the recess, using suitable methods such as metal-organic CVD (MOCVD), molecular beam epitaxy (MBE), liquid phase epitaxy (LPE), vapor phase epitaxy (VPE), selective epitaxial growth (SEG), the like, or combinations thereof.

Corresponding to optional operation 1512, the dummy gate structures in the transistor regions may be each replaced with an active gate structure. While forming the active gate structures in the transistor regions, the non-transistor regions may be covered (e.g., by a mask layer). The active gate structure can include a gate dielectric layer, a metal gate layer, and one or more other layers. The gate dielectric layer includes silicon oxide, silicon nitride, or multilayers thereof. In example embodiments, the gate dielectric layer includes a high-k dielectric material, and in these embodiments, the gate dielectric layer may have a k value greater than about 7.0, and may include a metal oxide or a silicate of Hf, Al, Zr, La, Mg, Ba, Ti, Pb, or combinations thereof. The formation methods of gate dielectric layer may include molecular beam deposition (MBD), atomic layer deposition (ALD), PECVD, and the like. The metal gate layer is formed over the gate dielectric layer. The metal gate layer may be a P-type work function layer, an N-type work function layer, multi-layers thereof, or combinations thereof, in some embodiments. Accordingly, the metal gate layer is sometimes referred to as a work function layer. In the discussion herein, a work function layer may also be referred to as a work function metal. Example P-type work function metals that may be included in the gate structures for P-type devices include TiN, TaN, Ru, Mo, Al, WN, $ZrSi_2$, $MoSi_2$, $TaSi_2$, $NiSi_2$, WN, other suitable P-type work function materials, or combinations thereof. Example N-type work function metals that may be included in the gate structures for N-type devices include Ti, Ag, TaAl, TaAlC, TiAlN, TaC, TaCN, TaSiN, Mn, Zr, other suitable N-type work function materials, or combinations thereof.

Corresponding to optional operation 1514 (which can also refer to FIGS. 9-14), a number of interconnecting structures may be formed in the transistor regions and non-transistor regions. For example, some of the interconnecting structures may be formed as contacts (903 and 940 of FIG. 9, 1010, 1012, 1014, 1030, 1032, and 1042 of FIGS. 10-11, 1240 and 1250 of FIG. 12, 1330, 1332, 1340, and 1342 of FIGS.

13-14) for the non-transistor-based cells in the non-transistor regions. Concurrently, some of the interconnecting structures may be formed as contacts (not shown) for the transistor-based cells in the transistor regions. The interconnecting structures may include a conductive material. The conductive material can include a metal material such as, for example, copper (Cu), aluminum (Al), tungsten (W), or combinations thereof.

In one aspect of the present disclosure, an integrated circuit design implementation system is disclosed. The system includes a first cell library including a plurality of first non-transistor-based cells, each of the plurality of first non-transistor-based cells associated with a respective delay value. The system includes a synthesis tool configured to receive and synthesize a behavioral description of a circuit design, and generate a logic gate-level circuit description from the behavioral description. The system includes a place and route tool configured to generate a layout from the logic gate-level circuit description. The system includes a timing analysis tool configured to detect a timing violation along a timing path of the layout, determine a value of the timing violation, and access, based on the determination, the first cell library to cause the place and route tool to update the layout by inserting one or more of the plurality of first non-transistor-based cells into the timing path. The system includes an output tool configured to output the updated layout to a manufacturing tool.

In another aspect of the present disclosure, a method for providing an integrated circuit design is disclosed. The method includes receiving and synthesizing a behavioral description of an integrated circuit design. The method includes generating, based on the synthesized behavioral description, a layout by placing and routing a plurality of transistor-based cells. The method includes selectively accessing a cell library that includes a plurality of non-transistor-based cells, each of the plurality of non-transistor-based cells associated with a respective delay value. The method includes updating the layout by inserting one or more of the plurality of non-transistor-based cells.

In yet another aspect of the present disclosure, a processing system program product for providing an integrated circuit design is disclosed. The processing system program product has a non-transitory processing system readable medium with a processing system program embodied thereon. The processing system program includes processing system program code for receiving and synthesizing a behavioral description of an integrated circuit design. The processing system program includes processing system program for generating a logic gate-level circuit description from the behavioral description. The processing system program includes processing system program code for placing and routing a plurality of transistor-based cells to generate a layout. The processing system program includes processing system program code for detecting a presence of a timing violation along a timing path of the layout. The processing system program includes processing system program code for determining a type and a value of the timing violation. The processing system program includes processing system program code for accessing a cell library that includes a plurality of non-transistor-based cells, each of the plurality of non-transistor-based cells associated with a respective delay value. The processing system program includes processing system program code for updating the layout by inserting one or more of the plurality of non-transistor-based cells into the timing path. The processing system program includes processing system program code for outputting the updated layout to a manufacturing tool.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit design implementation system, comprising:
    a first cell library including a plurality of first non-transistor-based cells, each of the plurality of first non-transistor-based cells having no transistor and associated with a respective delay value;
    a synthesis tool configured to:
        receive and synthesize a behavioral description of a circuit design; and
        generate a logic gate-level circuit description from the behavioral description;
    a place and route tool configured to generate a layout from the logic gate-level circuit description;
    a timing analysis tool configured to:
        detect a timing violation along a timing path of the layout;
        determine a value of the timing violation; and
        access, based on the determination, the first cell library to cause the place and route tool to update the layout by inserting one or more of the plurality of first non-transistor-based cells into the timing path; and
    an output tool configured to output the updated layout to a manufacturing tool.

2. The system of claim 1, wherein the timing analysis tool is configured to access the first cell library in response to determining that a delay value corresponding to the timing violation satisfies a predefined condition.

3. The system of claim 2, wherein the predefined condition includes a range less than about 10 picoseconds.

4. The system of claim 1, wherein the timing analysis tool is configured to access the first cell library in response to determining that a type of the timing violation is a hold time violation.

5. The system of claim 1, further comprising a second cell library including a plurality of second non-transistor-based cells, each of the second non-transistor-based cells associated with a respective delay value, wherein the plurality of first non-transistor-based cells have a first cell height and the plurality of second non-transistor-based cells have a second, different cell height.

6. The system of claim 5, wherein the timing analysis tool is configured to determine whether to access the first cell library or the second cell library based on a cell height of cells along the timing path.

7. The system of claim 1, wherein the place and route tool is configured to iteratively update the layout until the timing analysis tool detects no timing violation present in the layout.

8. The system of claim 1, further comprising a third cell library that includes a plurality of transistor-based cells, each of the plurality of transistor-based cells associated with a respective delay value.

9. The system of claim 8, wherein the timing analysis tool is configured to access the third cell library in response to determining that the value of the timing violation is equal to or greater than a predefined threshold, thereby causing the place and route tool to update the layout by inserting one or more of the plurality of transistor-based cells into the timing path, and wherein the predefined threshold is about 10 picoseconds.

10. The system of claim 1, wherein the place and route tool is configured to insert the one or more first non-transistor-based cells into an input of a cell along the timing path that is configured to capture data.

11. The system of claim 1, wherein each of the plurality of first non-transistor-based cells includes at least one polysilicon resistor, the respective delay value associated with a resistance value of the at least one polysilicon resistor and a capacitance value of a capacitor induced between a semiconductor substrate and the at least one polysilicon resistor.

12. An integrated circuit design implementation system, comprising:
a first cell library including a plurality of first non-transistor-based cells, each of the plurality of first non-transistor-based cells associated with a respective first delay value;
a second cell library including a plurality of second transistor-based cells, each of the plurality of second transistor-based cells associated with a respective second delay value;
a synthesis tool configured to:
receive and synthesize a behavioral description of a circuit design; and
generate a logic gate-level circuit description from the behavioral description;
a place and route tool configured to generate a layout from the logic gate-level circuit description;
a timing analysis tool configured to:
detect a timing violation along a timing path of the layout;
determine a value of the timing violation; and
based on the value of the timing violation, update the layout by inserting either one or more of the plurality of first non-transistor-based cells into the timing path or one or more of the plurality of second transistor-based cells into the timing path; and
an output tool configured to output the updated layout to a manufacturing tool.

13. The system of claim 12, wherein the timing analysis tool is configured to access the first cell library in response to determining that the value of the timing violation is less than a predefined condition.

14. The system of claim 13, wherein the timing analysis tool is configured to access the second cell library in response to determining that the value of the timing violation is equal to or greater than a predefined condition.

15. The system of claim 14, wherein the predefined condition includes a range from about 2 picoseconds to about 10 picoseconds.

16. The system of claim 12, wherein each of the plurality of first non-transistor-based cells has no transistor and includes at least one polysilicon resistor.

17. The system of claim 16, wherein the first delay value of a corresponding one of the plurality of first non-transistor-based cells is associated with a resistance value of the at least one polysilicon resistor and a capacitance value of a capacitor induced between a semiconductor substrate and the at least one polysilicon resistor.

18. The system of claim 12, wherein the place and route tool is configured to insert the one or more first non-transistor-based cells into an input of a cell along the timing path that is configured to capture data.

19. An integrated circuit design implementation system, comprising:
a first cell library including a plurality of first non-transistor-based cells, each of the plurality of first non-transistor-based cells associated with a respective first delay value;
a second cell library including a plurality of second transistor-based cells, each of the plurality of second transistor-based cells associated with a respective second delay value;
a synthesis tool configured to:
receive and synthesize a behavioral description of a circuit design; and
generate a logic gate-level circuit description from the behavioral description;
a place and route tool configured to generate a layout from the logic gate-level circuit description;
a timing analysis tool configured to:
detect a timing violation along a timing path of the layout;
determine a value of the timing violation;
in response to determining that the value of the timing violation is less than a predefined condition, update the layout by inserting one or more of the plurality of first non-transistor-based cells into the timing path; and
in response to determining that the value of the timing violation is equal to or greater than the predefined condition, update the layout by inserting one or more of the plurality of second transistor-based cells into the timing path; and
an output tool configured to output the updated layout to a manufacturing tool.

20. The system of claim 19, wherein each of the plurality of first non-transistor-based cells has no transistor and includes at least one polysilicon resistor, and wherein the first delay value of a corresponding one of the plurality of first non-transistor-based cells is associated with a resistance value of the at least one polysilicon resistor and a capacitance value of a capacitor induced between a semiconductor substrate and the at least one polysilicon resistor.

* * * * *